(12) United States Patent
George et al.

(10) Patent No.: US 8,727,778 B2
(45) Date of Patent: May 20, 2014

(54) TACTILE OVERLAY FOR POINT OF SALE TERMINAL

(75) Inventors: Maile George, Concord, CA (US); Jason Michael Ackiss, Matthews, NC (US); Robert Fleetwood Armstrong, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 463 days.

(21) Appl. No.: 12/755,100

(22) Filed: Apr. 6, 2010

(65) Prior Publication Data

US 2011/0184824 A1 Jul. 28, 2011

Related U.S. Application Data

(63) Continuation-in-part of application No. 12/695,841, filed on Jan. 28, 2010.

(51) Int. Cl.
*G09B 21/00* (2006.01)

(52) U.S. Cl.
CPC .................................. *G09B 21/003* (2013.01)
USPC .............. 434/113; 705/17; 434/112; 345/173

(58) Field of Classification Search
CPC ....................................................... G09B 21/03
USPC ...................... 705/17; 434/112, 113; 345/173
See application file for complete search history.

(56) References Cited

U.S. PATENT DOCUMENTS

| | | | |
|---|---|---|---|
| 7,644,039 B1 * | 1/2010 | Magee et al. ................... 705/43 |
| 2005/0030296 A1 * | 2/2005 | Stohrer et al. ................. 345/173 |
| 2006/0017810 A1 * | 1/2006 | Kurzweil et al. .......... 348/207.1 |
| 2006/0172266 A1 * | 8/2006 | Rogers et al. ................. 434/112 |
| 2010/0097327 A1 * | 4/2010 | Wadsworth ................... 345/173 |

OTHER PUBLICATIONS

"Tactile Interface", Memory Alpha, the Star Trek Wiki, Aug. 27, 2006, 1 pg.*

* cited by examiner

*Primary Examiner* — Ryan Zeender
*Assistant Examiner* — Hunter Wilder
(74) *Attorney, Agent, or Firm* — Michael A. Springs; Moore and Van Allen, PLLC; Patrick B. Horne

(57) ABSTRACT

Systems and methods provide tactile assistance to a consumer completing a transaction at a point of sale terminal. A tactile overlay, either permanent or removable, couples with a consumer interface such as a touch screen of the point of sale terminal. The tactile overlay includes one or more overlay inputs that provide a distinct tactile impression in comparison with the remainder of the overlay. For example, the overlay inputs can be depressions, apertures, protrusions, dimples, or the like, or provide a different texture such as a rougher or smoother texture than the surrounding overlay. The overlay inputs are configured to correspond with underlying touch screen inputs such that the consumer using the tactile overlay can discern the proper location on the touch screen for providing the desired input.

39 Claims, 14 Drawing Sheets

US 8,727,778 B2

TACTILE OVERLAY FOR POINT OF SALE TERMINAL

CLAIM OF PRIORITY UNDER 35 U.S.C. §119

This application is a continuation-in-part of U.S. patent application Ser. No. 12/695,841 titled "Payment Device Triggered Modified Transaction Session at Point of Sale" filed Jan. 28, 2010, assigned to the assignee hereof and hereby expressly incorporated by reference herein.

FIELD

In general, embodiments of the invention relate to point of sale transactions, and, more particularly, relate to systems, methods, and computer program products for providing a consumer with a tactile overlay for assisting the consumer with providing input to a consumer interface of the point of sale terminal.

BACKGROUND

When engaged in a point-of-sale (POS) transaction, a consumer typically has the opportunity to review information regarding the goods and/or services being purchased on a consumer interface such as a video display or touch screen as the products are scanned. The information provided to the consumer may include the name of the product being purchased, the quantity being purchased, the price of the product, discounts applied to the price of the product and other information. Additionally, the consumer is typically required to provide input regarding various steps of the transaction, for example, input corresponding to a PIN number to validate a payment device or input corresponding to a desired amount of cash back. Such input, in many configurations is provided using a touch screen consumer interface. Unfortunately, some consumers are unable to read the touch screen, for example due to visual impairment, and therefore, cannot provide effective input to the touch screen. In one scenario, a consumer with visual impairment approaches a point of sale terminal to complete a transaction, and, when the point of sale terminal requires input, the consumer must communicate his or her input verbally to the cashier. Of course, such open communication of potentially private information, such as account PIN numbers and the like, creates a serious security risk.

Therefore, systems and methods are needed to provide tactile assistance to a consumer in providing input to the point of sale terminal in order to more easily complete the transaction. Additionally, systems and methods are needed to provide the consumer with a modified transaction process when triggered by the consumer's device, such as a mobile device, transaction device or payment device, indicating the consumer's preference for a transaction process using a tactile overlay for providing input to the consumer interface of the point of sale terminal.

SUMMARY

Systems and methods provide tactile assistance to a consumer completing a transaction at a point of sale terminal. A tactile overlay, either permanent or removable, couples with a consumer interface such as a touch screen of the point of sale terminal. The tactile overlay includes one or more overlay inputs that provide a distinct tactile impression in comparison with the remainder of the overlay. For example, the overlay inputs can be depressions, apertures, protrusions, dimples or the like, or provide a different texture such as a rougher or smoother texture than the surrounding overlay. The overlay inputs are configured to correspond with underlying touch screen inputs such that the consumer using the tactile overlay can discern the proper location on the touch screen for providing the desired input.

According to one embodiment of the present invention, a tactile overlay is configured for assisting a consumer engaging in a transaction at a vendor's point of sale terminal. The terminal includes a consumer interface having a touch screen display, and the tactile overlay includes a front portion configured for coupling with a front side of the touch screen display comprising a touch screen. The front portion of the tactile overlay has a front portion tactile characteristic. The tactile overlay also includes one or more overlay inputs disposed on the front portion of the tactile overlay, the one or more overlay inputs configured for corresponding with one or more touch screen inputs displayed on the touch screen display. The one or more overlay inputs are also configured for providing the consumer an overlay input tactile characteristic distinct from the front portion tactile characteristic.

In some embodiments, the tactile overlay is configured for permanent attachment to the consumer interface of the point of sale terminal, and in others, it is configured for removable attachment to the consumer interface of the point of sale terminal. In some embodiments, the tactile overlay is at least partially transparent, thereby providing visual perception of the underlying touch screen display.

In some embodiments, the front portion tactile characteristic includes a front portion texture and the overlay input tactile characteristic includes an input texture, the front portion texture and the input texture being distinguishable from each other by tactile feel. In some embodiments, the front portion texture is relatively more smooth than the input texture. In some embodiments, the front portion texture is relatively more rough than the input texture.

In some embodiments, at least one of the one or more overlay inputs include a depression in the front portion such that the front portion tactile characteristic includes a relatively higher surface than the depression of the one or more overlay inputs, and the overlay input tactile characteristic includes a relatively lower surface than the front portion. In some embodiments, at least one of the one or more overlay inputs include a raised portion such that the front portion tactile characteristic includes a relatively lower surface than the raised portion of the one or more overlay inputs, and the overlay input tactile characteristic includes a relatively higher surface than the front portion. In some embodiments, at least one of the one or more overlay inputs include an aperture defined by the front portion, and wherein the front portion tactile characteristic includes a relatively higher tactile overlay surface than the one or more overlay inputs, and the overlay input tactile characteristic includes a relatively lower touch screen surface.

In some embodiments, the front portion includes one or more tactile instructions each corresponding to one or more overlay inputs and configured for providing the consumer information regarding the function of the one or more touch screen inputs corresponding to the one or more overlay inputs. In some embodiments, at least one of the one or more overlay inputs includes one or more tactile instructions. In some embodiments, at least one or more of the tactile instructions comprises Braille instructions.

In some embodiments, the tactile overlay also includes a variable Braille tool configured for providing variable Braille tactile instructions to the consumer, receiving control commands from a processing device of the terminal. In such embodiments, the variable Braille tactile instructions provide information related to at least one of the one or more touch screen inputs corresponding to at least one of the one or more overlay inputs.

In some embodiments, the permanently attached tactile overlay is configured for moving between at least two positions comprising a tactile assistance position and a non-assistance position. In the tactile assistance position, the tactile overlay is positioned such that the one or more overlay inputs are positioned proximate the corresponding one or more touch screen inputs for assisting the consumer during the transaction. In the non-assistance position, the tactile overlay is positioned such that the one or more overlay inputs are not positioned proximate the corresponding one or more touch screen inputs and therefore do not assist the consumer during the transaction.

According to another embodiment of the present invention, a point of sale system provides tactile assistance to a consumer completing a transaction at a point of sale of a vendor. The system includes a point of sale terminal having a consumer interface. The consumer interface includes a touch screen display configured for providing a visual representation corresponding to one or more touch screen inputs and for receiving consumer input when the consumer touches a portion of the display corresponding to the one or more touch screen inputs. The consumer interface also includes a tactile overlay configured for assisting a consumer engaging in a transaction at the vendor's point of sale terminal. The tactile overlay includes a front portion configured for coupling with a front side of the touch screen display, the front portion of the tactile overlay having a front portion tactile characteristic. The tactile overlay also includes one or more overlay inputs disposed on the front portion of the tactile overlay, the one or more overlay inputs configured for corresponding with one or more touch screen inputs displayed on the touch screen display and also configured for providing the consumer an overlay input tactile characteristic distinct from the front portion tactile characteristic.

In some embodiments, the system includes a tactile overlay instruction kiosk connected with the point of sale and configured for providing tutorial information to the consumer regarding use of the tactile overlay before or during the point of sale transaction.

In other embodiments, the system includes a consumer device configured for assisting the consumer during the transaction, and the point of sale terminal is configured for connecting with the consumer device and communicating transaction information to the consumer device. The transaction information includes information instructing the consumer regarding use of the tactile overlay during the transaction. The consumer device is also configured for processing the transaction information to create an audible transaction information signal based at least in part on some or all of the transaction information, and the consumer device is further configured for communicating the audible transaction information signal. In some embodiments, the system includes a listening device configured for communicating with the consumer device and receiving the audible transaction information signal. The listening device also produces sound waves audible to the consumer using the audible transaction information signal, thereby instructing the consumer using the tactile overlay during the transaction. In some embodiments, the consumer device includes a listening device for receiving the audible transaction information signal and producing the sound waves audible to the consumer based at least in part on the audible transaction information signal, thereby instructing the consumer using the tactile overlay during the transaction.

In some embodiments, the tactile overlay is configured for permanent attachment to the consumer interface of the point of sale terminal, and in others, it is configured for removable attachment to the consumer interface of the point of sale terminal. In some embodiments, the tactile overlay is at least partially transparent, thereby providing visual perception of the underlying touch screen display.

In some embodiments, the front portion tactile characteristic includes a front portion texture and the overlay input tactile characteristic includes an input texture, the front portion texture and the input texture being distinguishable from each other by tactile feel. In some embodiments, the front portion texture is relatively more smooth than the input texture. In some embodiments, the front portion texture is relatively more rough than the input texture.

In some embodiments, at least one of the one or more overlay inputs include a depression in the front portion such that the front portion tactile characteristic includes a relatively higher surface than the depression of the one or more overlay inputs, and the overlay input tactile characteristic includes a relatively lower surface than the front portion. In some embodiments, at least one of the one or more overlay inputs include a raised portion such that the front portion tactile characteristic includes a relatively lower surface than the raised portion of the one or more overlay inputs, and the overlay input tactile characteristic includes a relatively higher surface than the front portion. In some embodiments, at least one of the one or more overlay inputs include an aperture defined by the front portion, and wherein the front portion tactile characteristic includes a relatively higher tactile overlay surface than the one or more overlay inputs, and the overlay input tactile characteristic includes a relatively lower touch screen surface.

In some embodiments, the front portion includes one or more tactile instructions each corresponding to one or more overlay inputs and configured for providing the consumer information regarding the function of the one or more touch screen inputs corresponding to the one or more overlay inputs. In some embodiments, at least one of the one or more overlay inputs includes one or more tactile instructions. In some embodiments, at least one or more of the tactile instructions comprises Braille instructions.

In some embodiments, the tactile overlay also includes a variable Braille tool configured for providing variable Braille tactile instructions to the consumer, receiving control commands from a processing device of the terminal. In such embodiments, the variable Braille tactile instructions provide information related to at least one of the one or more touch screen inputs corresponding to at least one of the one or more overlay inputs.

In some embodiments, the permanently attached tactile overlay is configured for moving between at least two positions comprising a tactile assistance position and a non-assistance position. In the tactile assistance position, the tactile overlay is positioned such that the one or more overlay inputs are positioned proximate the corresponding one or more touch screen inputs for assisting the consumer during the transaction. In the non-assistance position, the tactile overlay is positioned such that the one or more overlay inputs are not positioned proximate the corresponding one or more touch screen inputs and therefore do not assist the consumer during the transaction.

According to another embodiment of the present invention, a method provides a consumer tactile assistance in completing a transaction at a point of sale terminal. The method includes receiving consumer input regarding the consumer's preference for a tactile overlay transaction modification before or during the point of sale transaction; coupling a tactile overlay with a consumer interface having a touch screen display for receiving consumer input regarding the transaction; and receiving consumer input regarding the transaction with the touch screen display. In some embodiments, coupling includes automatically installing the tactile overlay on the consumer interface based at least in part on the received consumer input. In some embodiments, the method also includes performing, in conjunction with the method, at least one of an audible transaction process, a mobile device consumer interface transaction process, and a modified transaction process.

Accordingly to another embodiment of the present invention, a system provides a consumer tactile assistance in completing a transaction at a point of sale terminal. The system includes means for receiving consumer input regarding the consumer's preference for a tactile overlay transaction modification before or during the point of sale transaction; means for coupling a tactile overlay with a consumer interface having a touch screen display for receiving consumer input regarding the transaction; and means for receiving consumer input regarding the transaction with the touch screen display. In some embodiments, the means for coupling includes means for automatically installing the tactile overlay on the consumer interface based at least in part on the received consumer input. In some embodiments, the system also includes means for performing at least one of an audible transaction process, a mobile device consumer interface transaction process, and a modified transaction process.

BRIEF DESCRIPTION OF THE DRAWINGS

Figure 1:
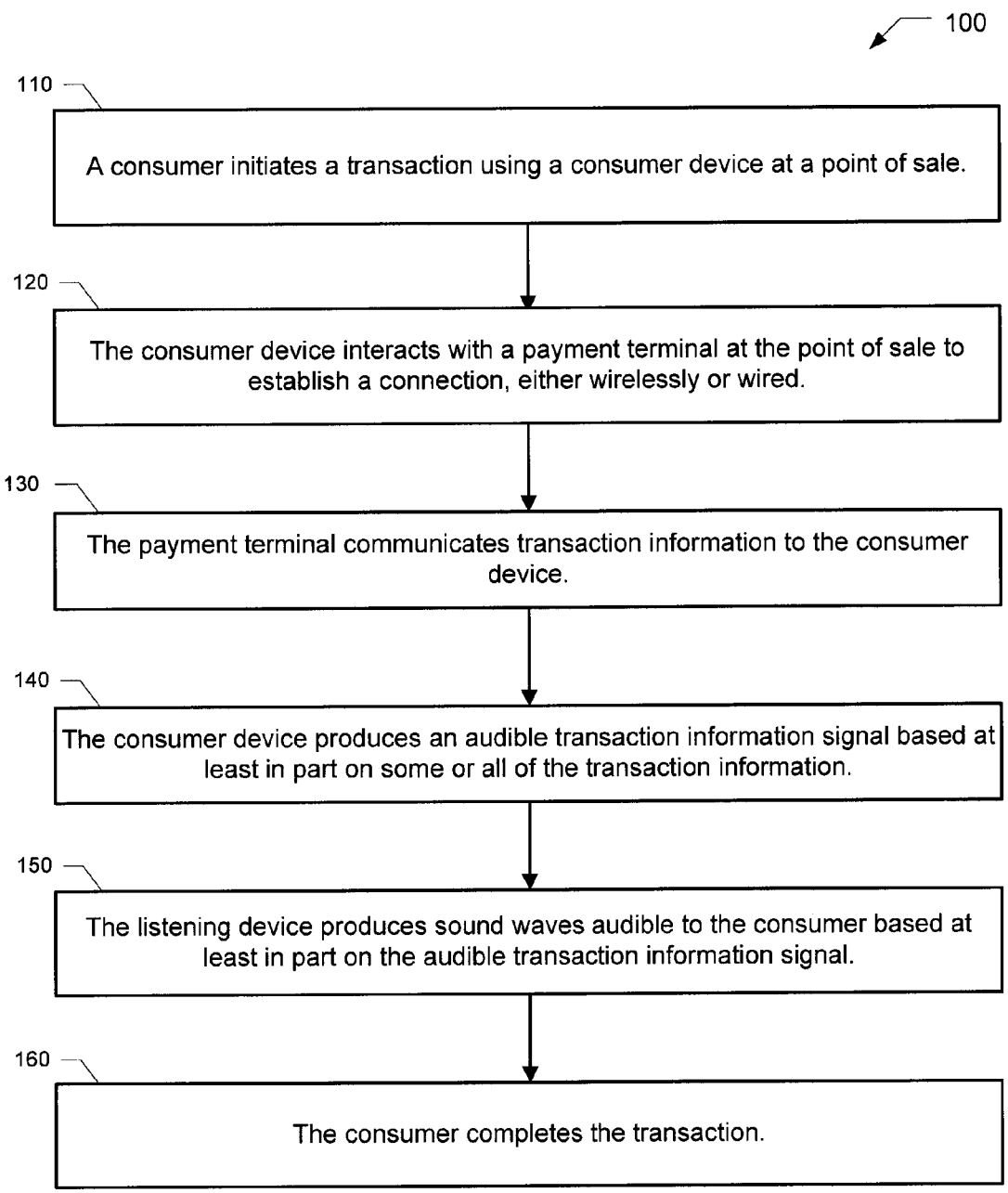
Figure 2:
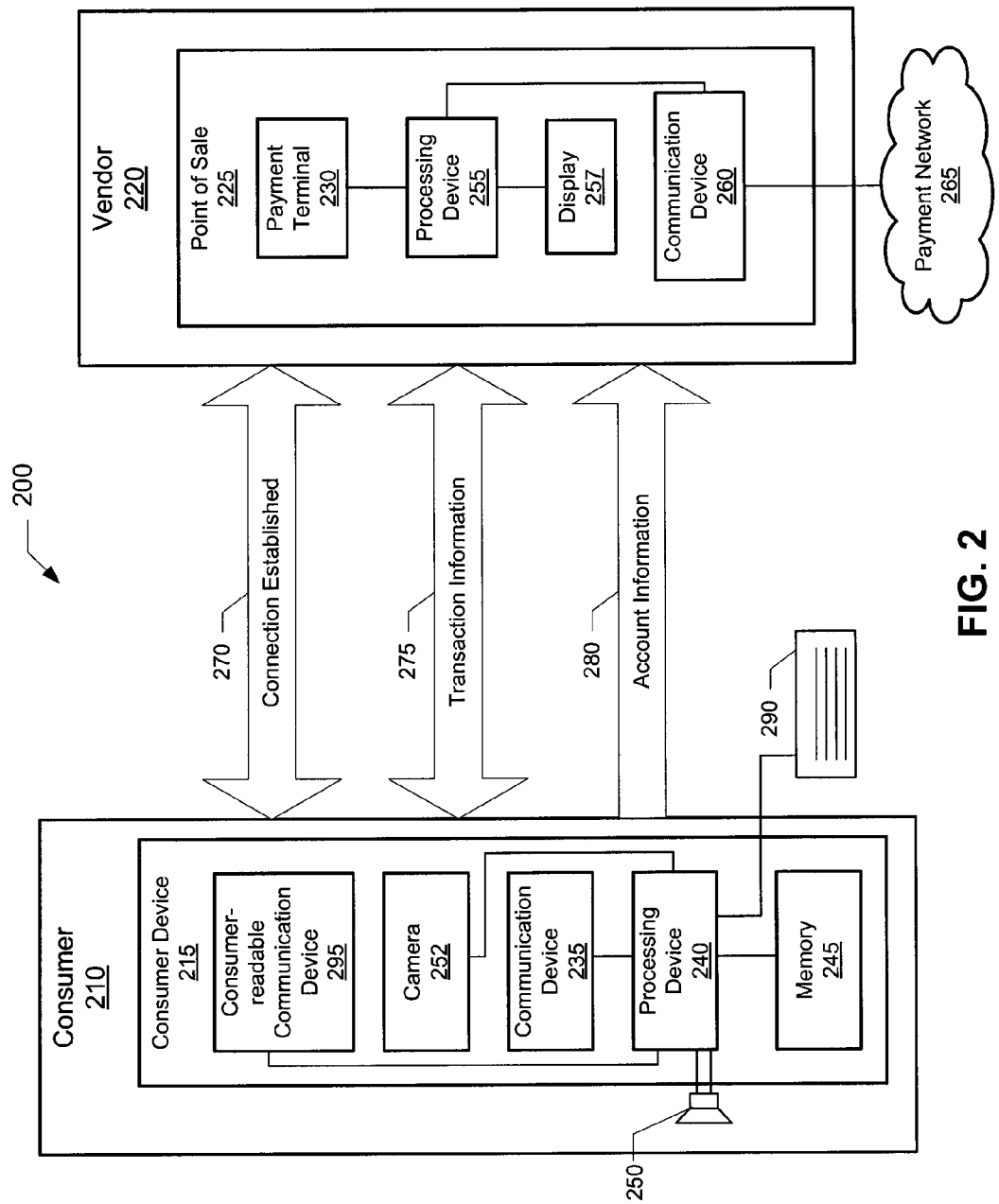
Figure 3:
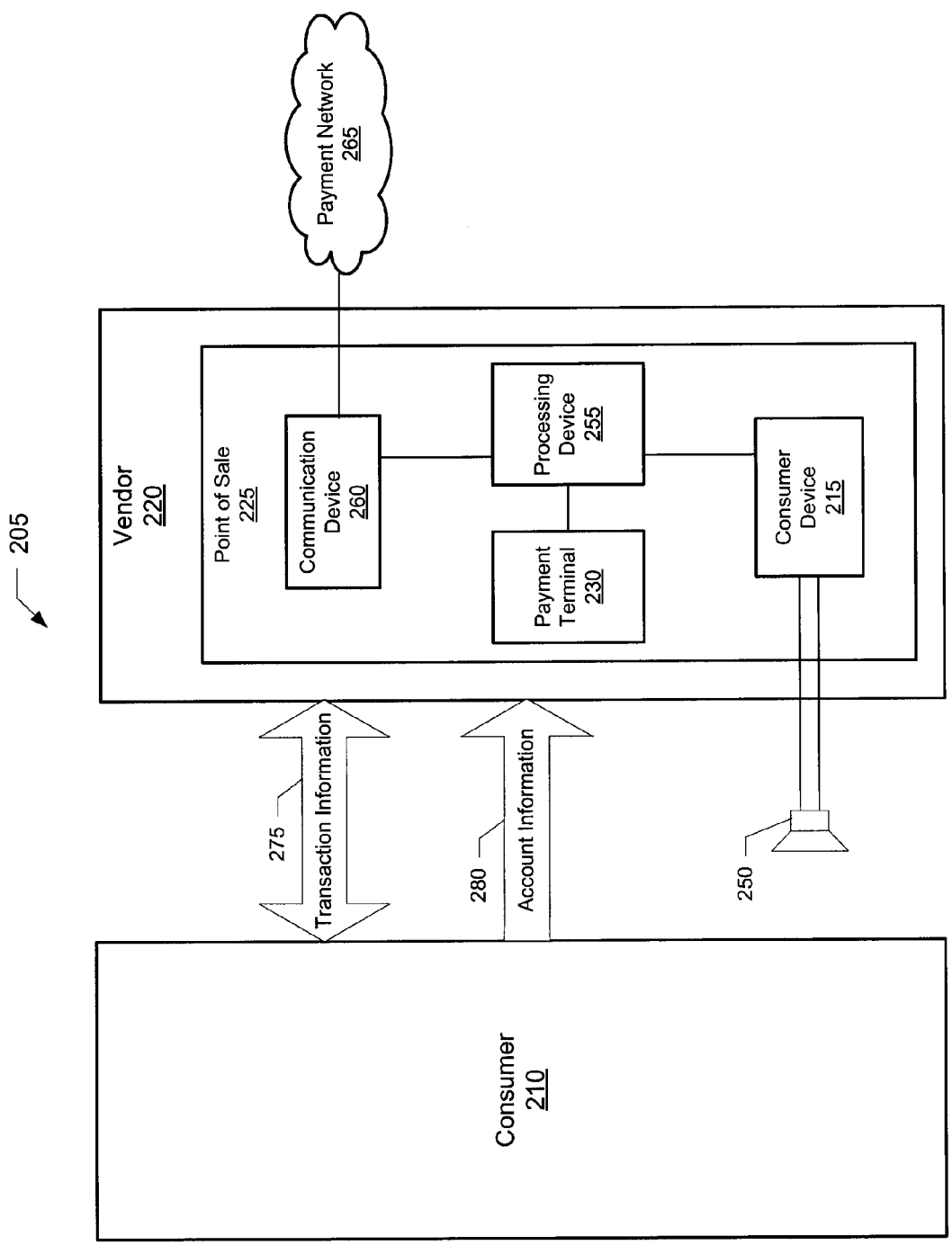
Figure 4:
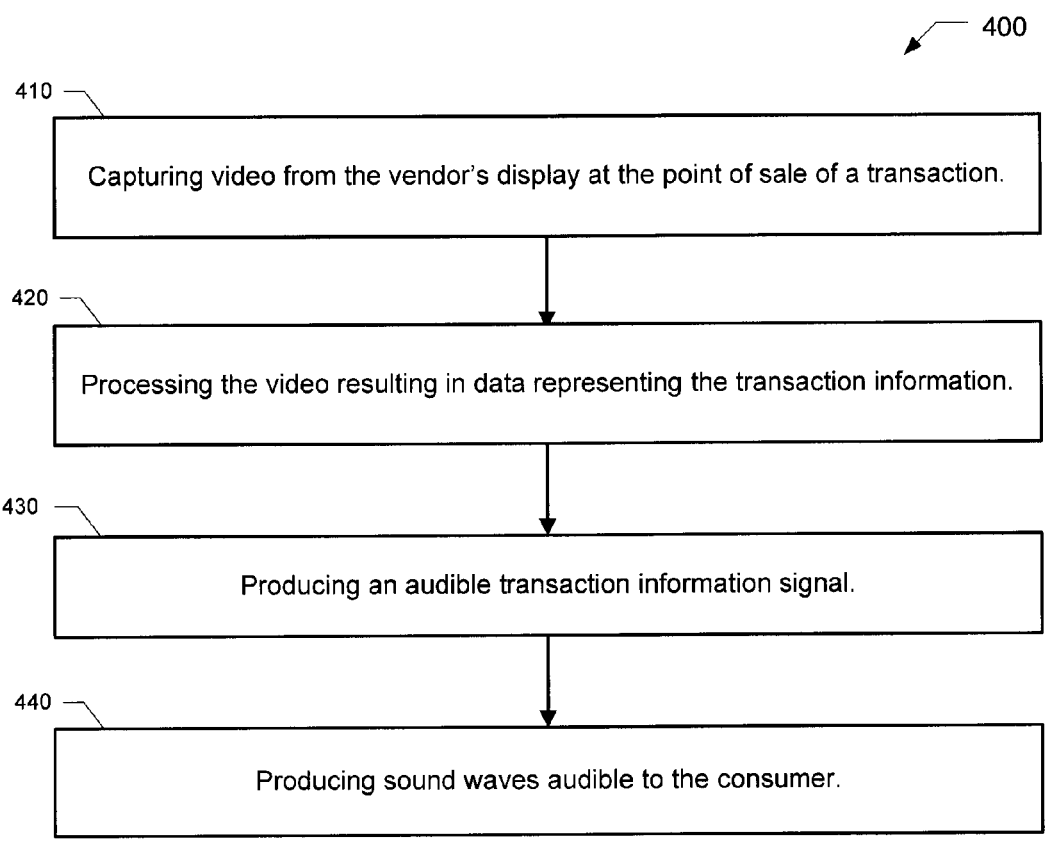
Figure 5:
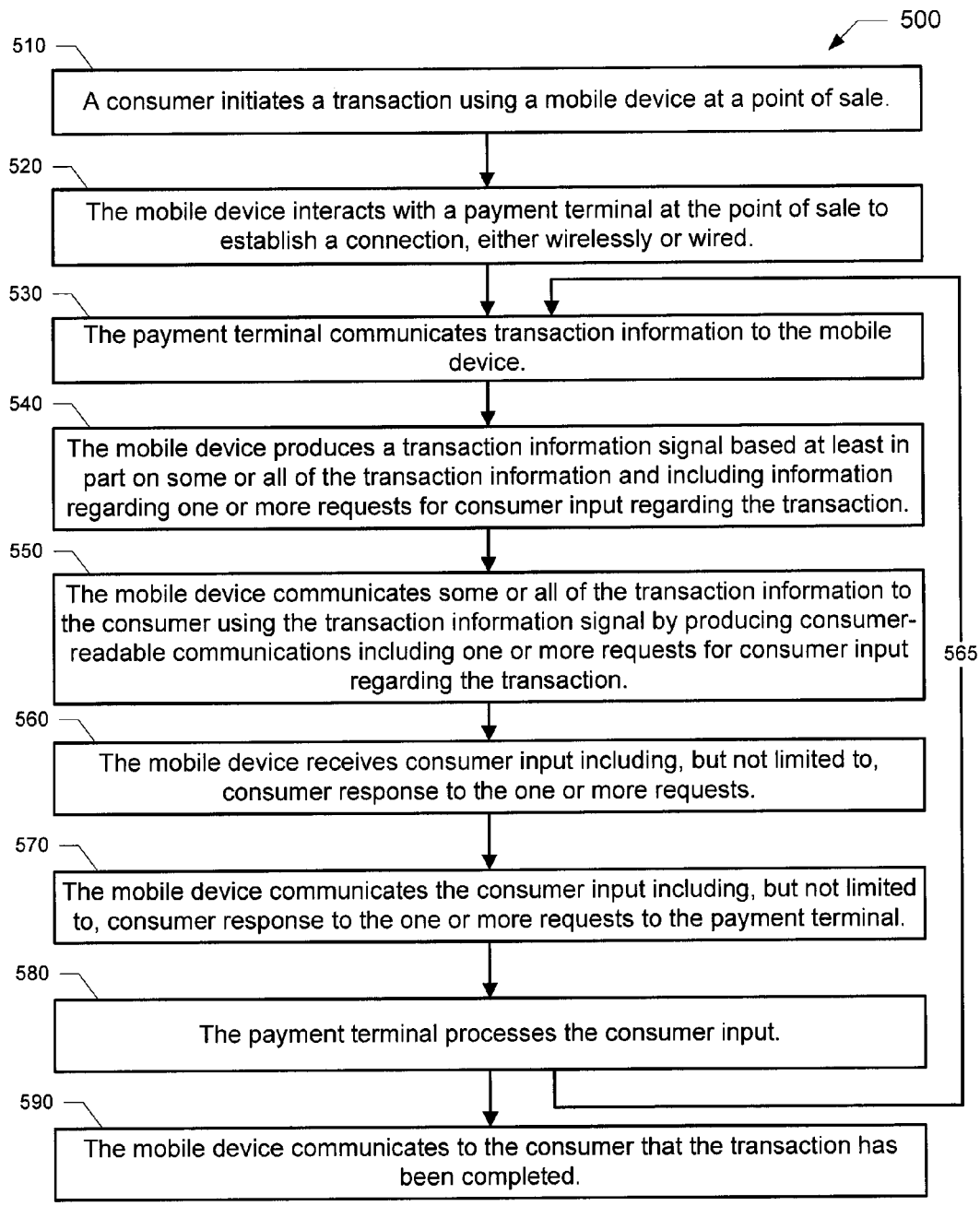
Figure 6:
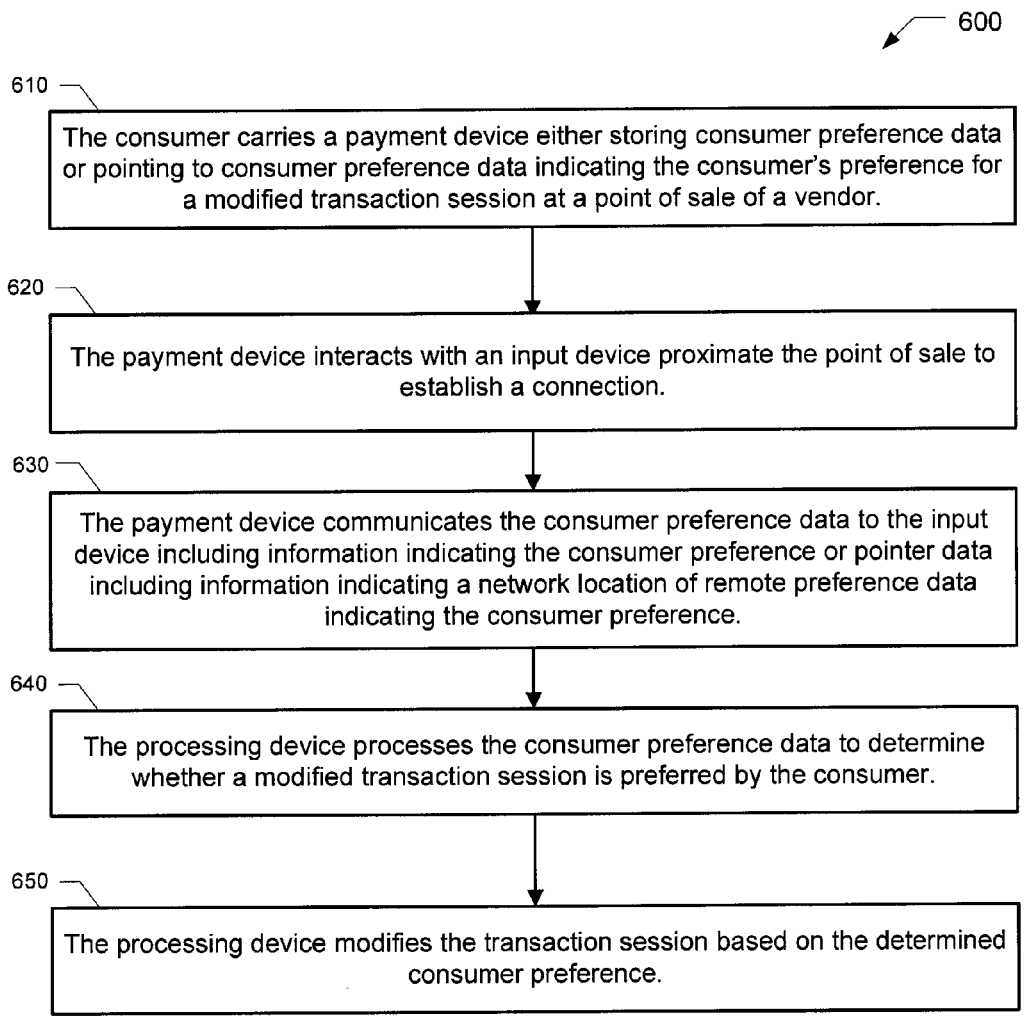
Figure 7:
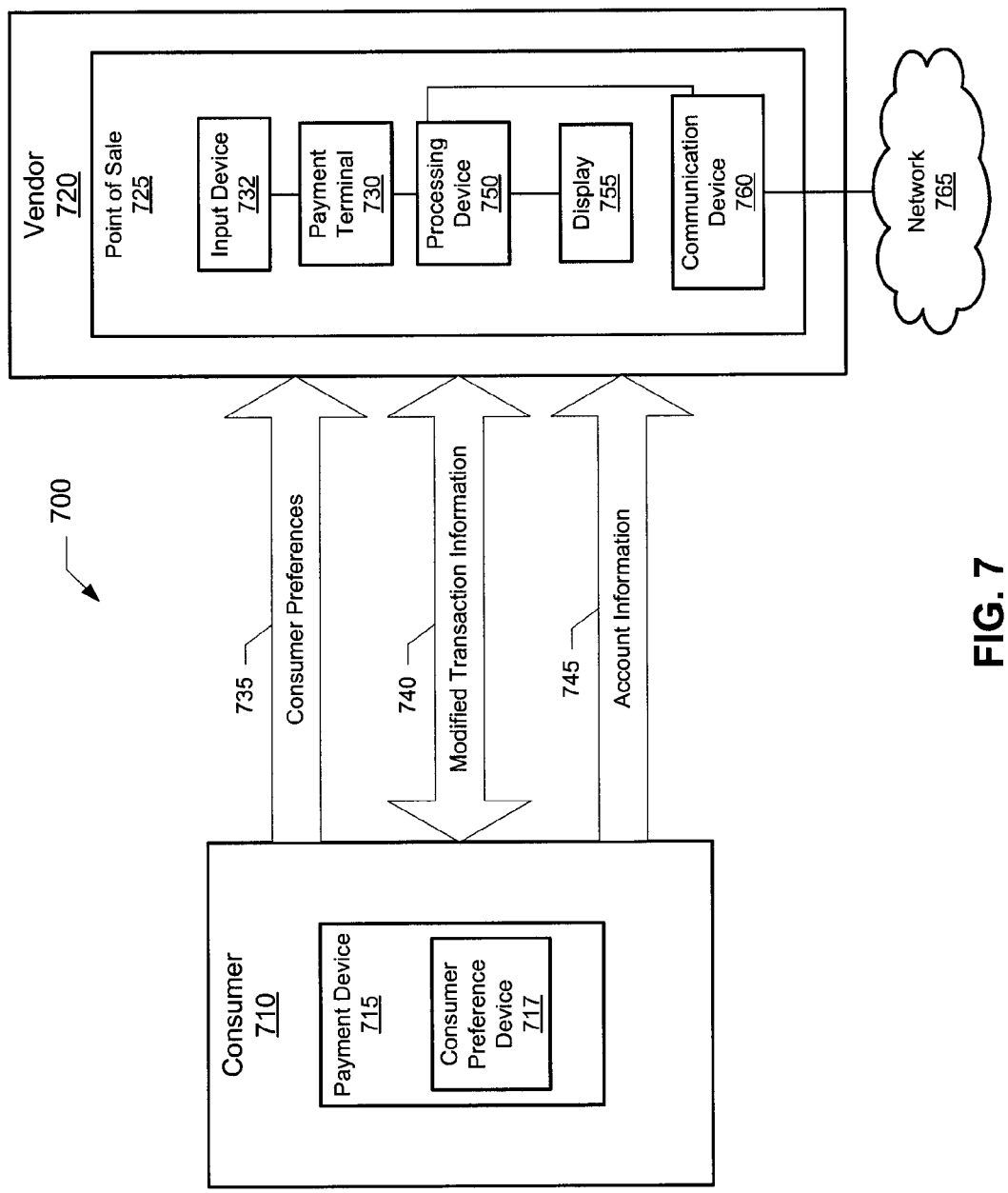
Figure 8:
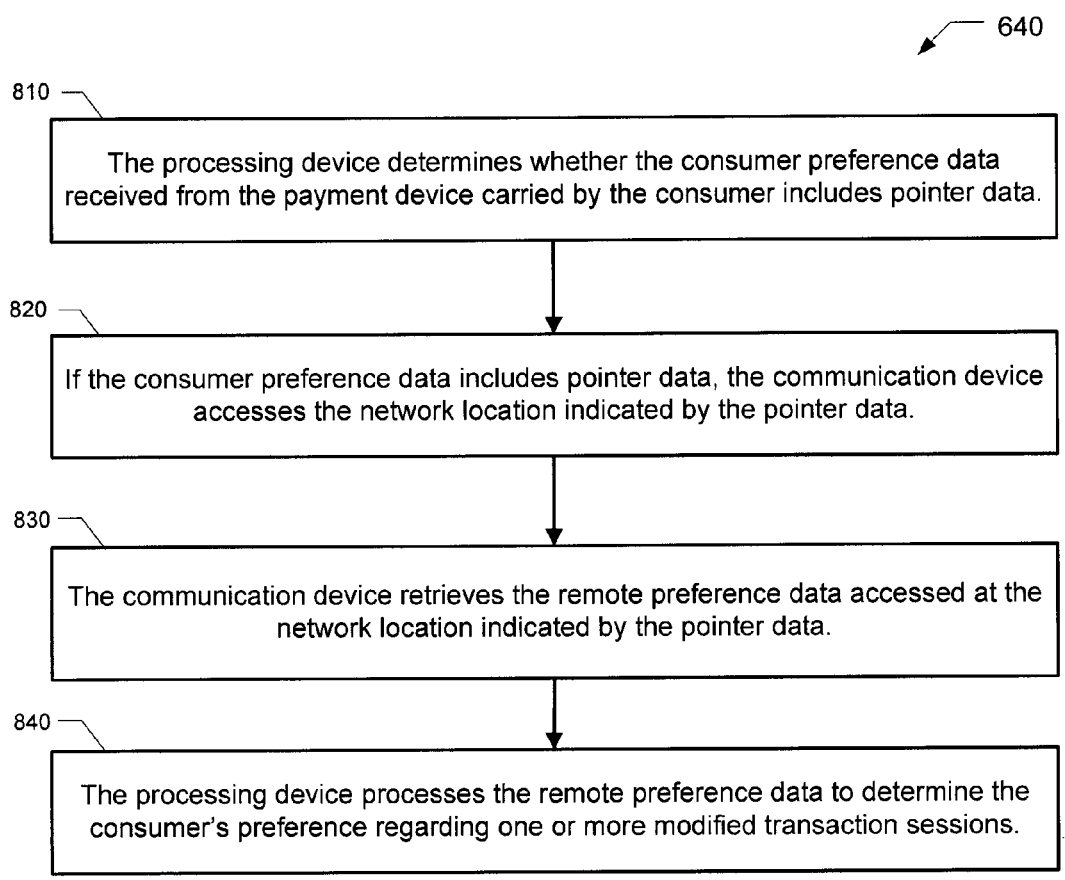
Figure 9A:
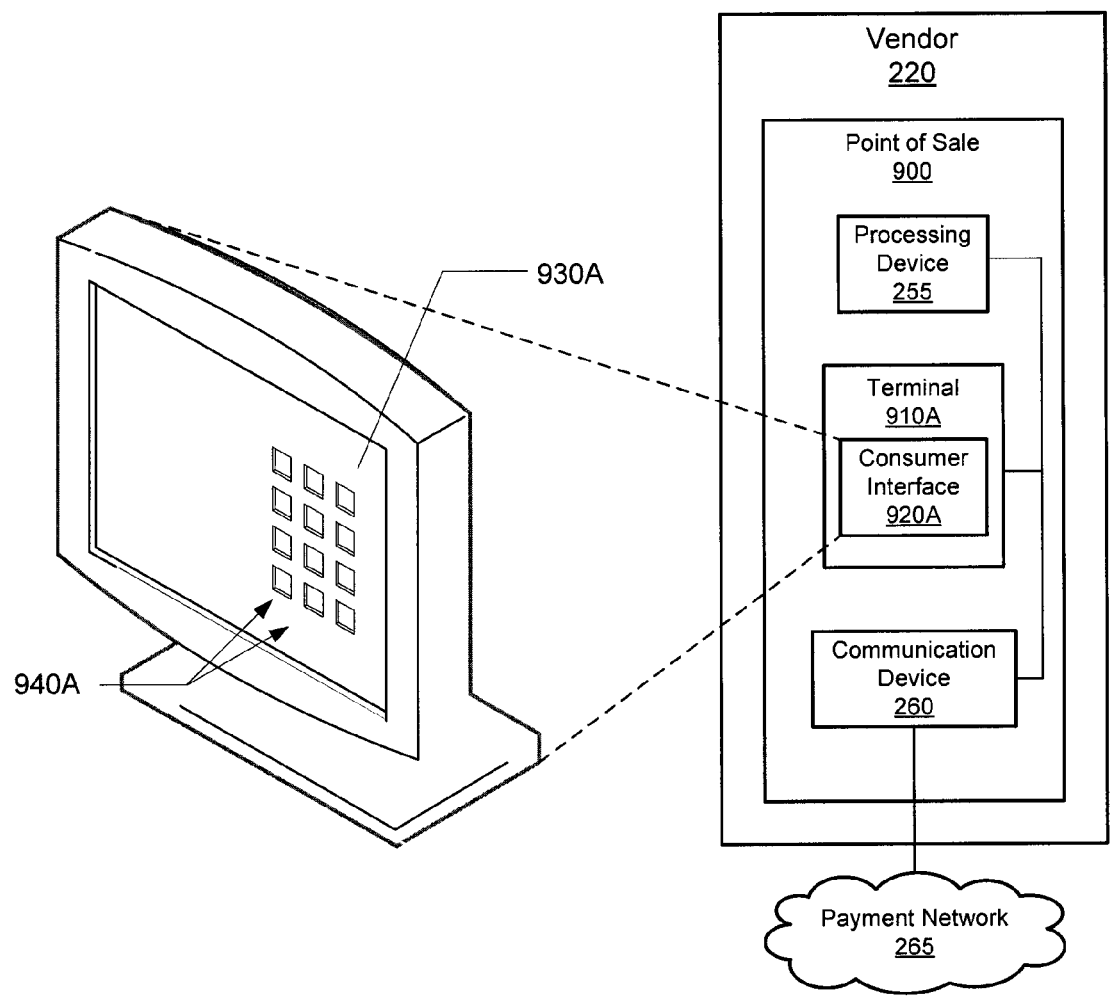
Figure 9B:
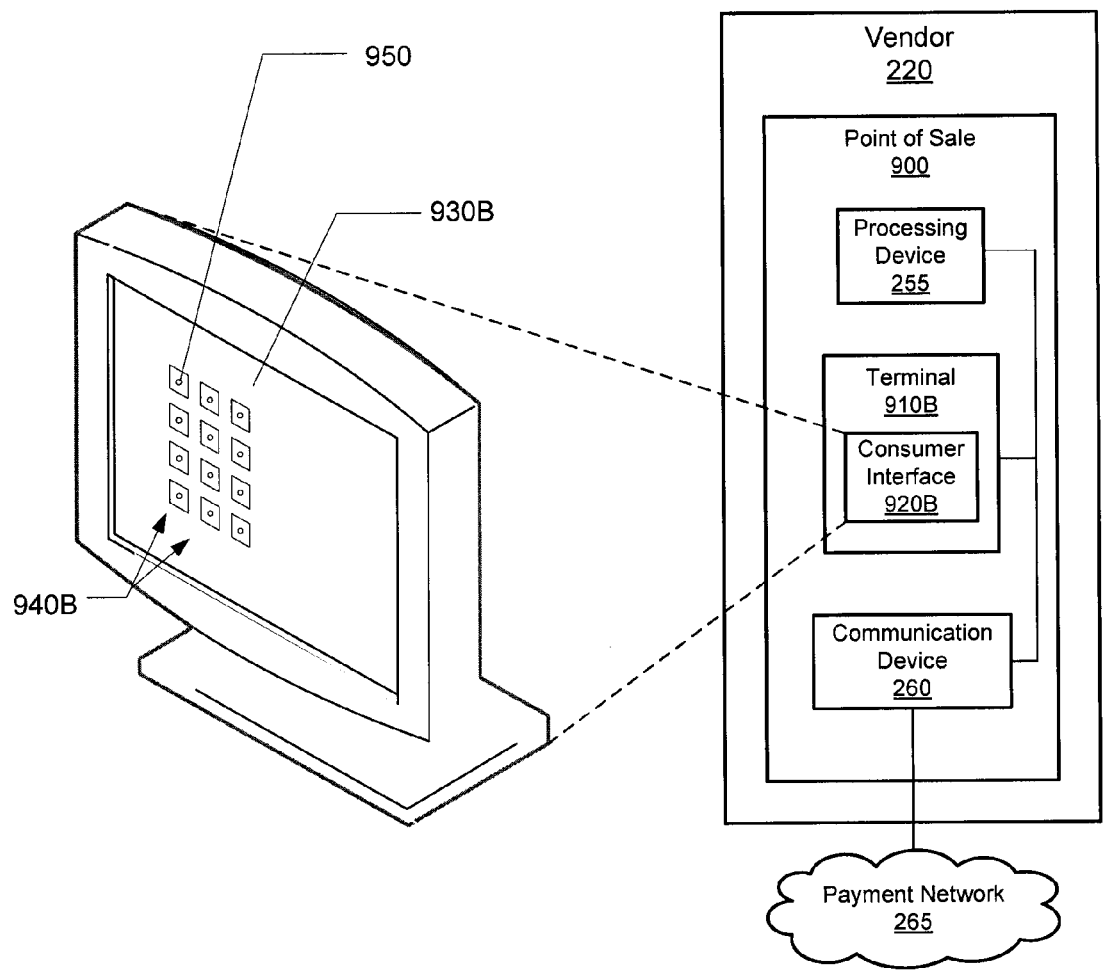
Figure 10A:
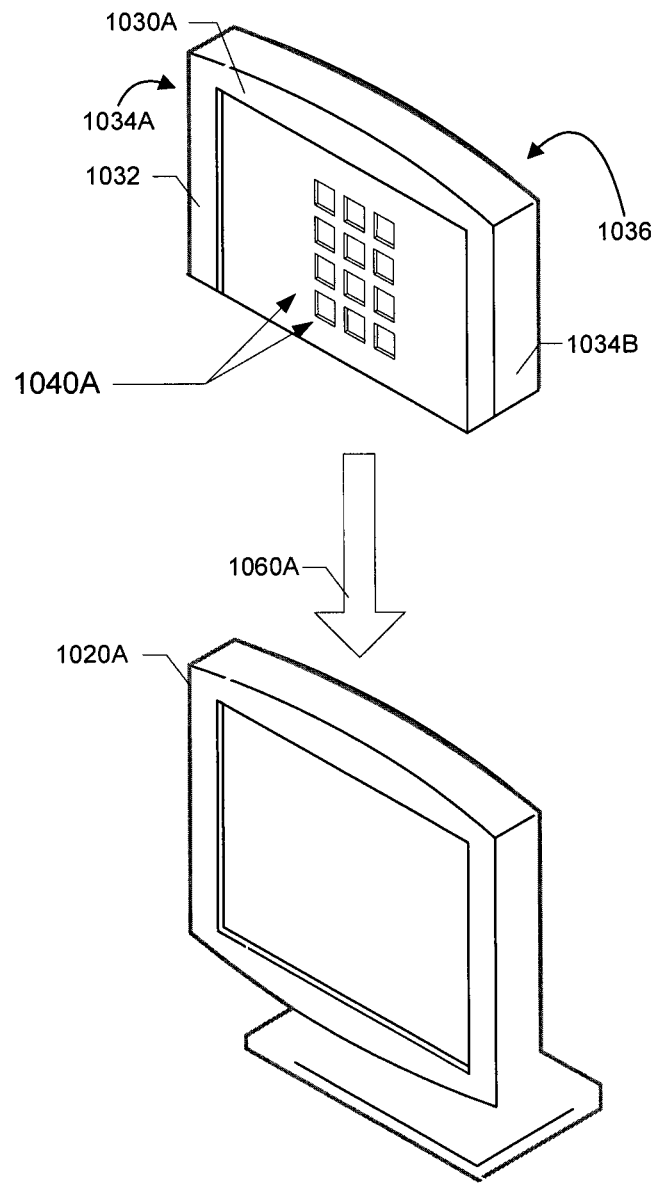
Figure 10B:
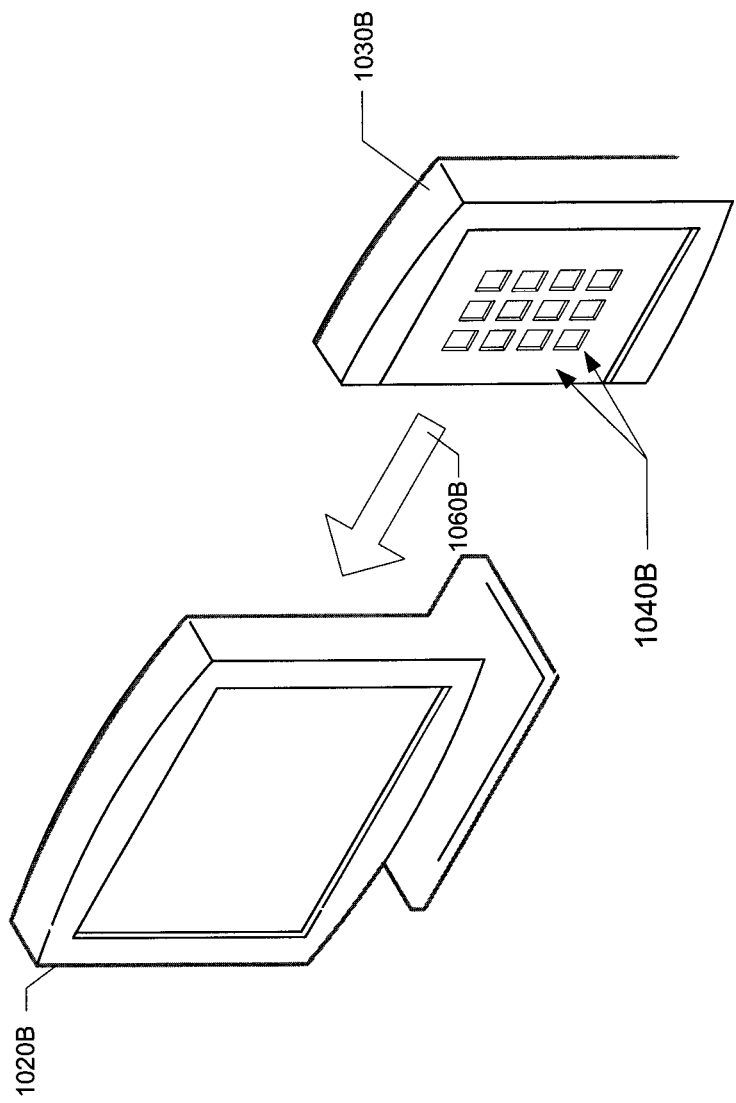
Figure 11:
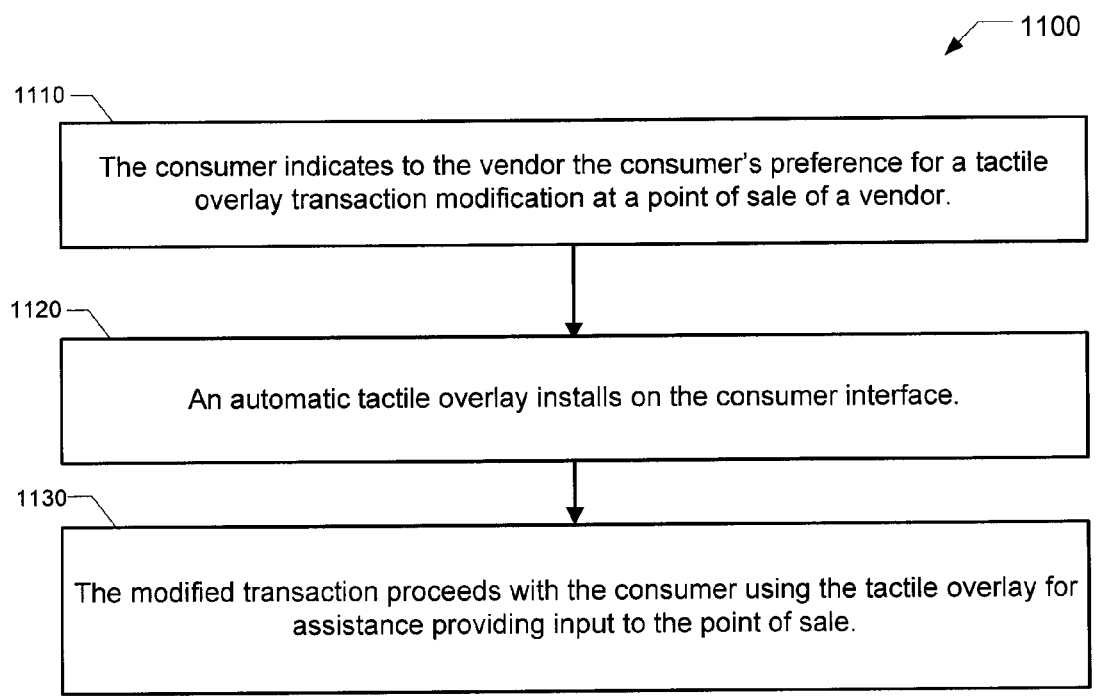
Figure 12:
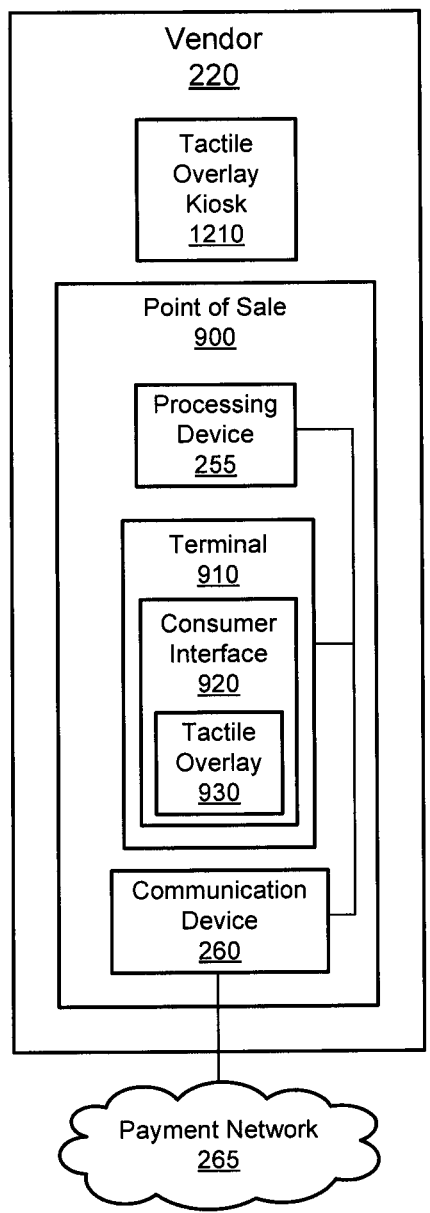

Having thus described embodiments of the invention in general terms, reference will now be made to the accompanying drawings, which are not necessarily drawn to scale, and wherein:

FIG. 1 is a flow diagram illustrating an audible transaction process, in accordance with one embodiment of the present invention;

FIG. 2 is a block diagram providing a more detailed illustration of an audible transaction system, in accordance with one embodiment of the present invention;

FIG. 3 is a block diagram providing a more detailed illustration of an audible transaction system, in accordance with another embodiment of the present invention;

FIG. 4 is a flow diagram illustrating a visual recognition audible transaction process, in accordance with one embodiment of the present invention;

FIG. 5 is a flow diagram illustrating a mobile device consumer interface transaction process, in accordance with one embodiment of the present invention;

FIG. 6 is a flow diagram illustrating a process for providing a consumer a modified transaction process;

FIG. 7 is a block diagram providing an illustration of a system for providing a consumer with a modified transaction process;

FIG. 8 is a flow diagram illustrating a method for processing consumer preference data;

FIG. 9A is a block diagram providing an illustration of a vendor's point of sale including a terminal having a consumer interface configured with a permanent tactile overlay according to one embodiment of the invention;

FIG. 9B is a block diagram providing an illustration of a vendor's point of sale including a terminal having a consumer interface configured with a permanent tactile overlay according to another embodiment of the invention;

FIG. 10A is a block diagram providing an illustration of a consumer interface receiving a removable tactile overlay according to one embodiment of the invention;

FIG. 10B is a block diagram providing an illustration of a consumer interface receiving a removable tactile overlay according to another embodiment of the invention;

FIG. 11 is a flow diagram illustrating a process for providing a tactile overlay for assistance in completing a transaction based on the consumer's preference according to one embodiment of the invention; and FIG. 12 is a block diagram providing an illustration of a vendor's point of sale including a tactile overlay kiosk according to one embodiment of the invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1 is a flow diagram illustrating an audible transaction process 100 in accordance with one embodiment of the present invention. As represented by block 110, a consumer initiates a transaction using a consumer device at a point of sale. For example, the consumer may initiate a transaction to purchase goods or services from a vendor. In one embodiment, a consumer approaches the point of sale carrying a consumer device such as a cellular phone, smartphone, personal digital assistant (PDA), personal navigation device such as a global positioning system (GPS) receiver, personal music player such as a Moving Picture Experts Group Layer-3 Audio (MP3) player, or the like and requests the purchase of goods and/or services. In some embodiments, the consumer device is a wireless communication device and in others the consumer device is configured for connecting via a wired connection. In some embodiments, the consumer device is part of the point of sale and is not a mobile device carried by the consumer.

As used herein, "transaction" refers to any interaction between a consumer and vendor proximate the vendor's point of sale. For example, a consumer may interact with a payment terminal proximate the point of sale of the vendor in order to receive transaction information and provide consumer input. As used herein, "payment terminal" refers to any terminal proximate the point of sale and operated by the vendor in order to interact with one or more consumers. For example, in some embodiments, a payment terminal may include, but is not limited to, a keypad, a monitor, a card-reading device and the like. In some embodiments, a payment terminal includes one or more of a processing device, a communication device, an input device and other components or one or more of those components are separate from the payment terminal and are configured for communicating with the payment terminal.

As represented by block 120, the consumer device interacts with a payment terminal at the point of sale, via either a wireless or wired connection. In one embodiment the user device is configured for a wired connection. In such a configuration, the consumer physically connects the consumer device with the payment terminal. For example, in one embodiment, the payment terminal includes a universal serial bus (USB) cable for connecting with a consumer device, and the consumer recognizes the cable and connects the consumer device via the USB cable. In other embodiments, the consumer device connects with the payment terminal wirelessly. Such a connection can be initiated by either the consumer device or the payment terminal. For example, in one embodiment the consumer device is a smartphone having wireless communication capabilities. The smartphone recognizes the presence of the payment terminal at the point of sale and begins wireless communication with the payment terminal. In another embodiment the payment terminal at the point of sale recognizes the presence of the consumer device and begins wireless communication with the consumer device.

In some embodiments, the interaction between the consumer device and the payment terminal includes authentication of the identity of the consumer. The type of authentication varies drastically across various points of sale. For example, in one embodiment, the identity of the consumer is authenticated by the consumer using the consumer device to communicate some type of security code such as a PIN number or answer one or more security questions. Authentication can be performed using one security measure or multiple security measures. For example, in one embodiment, two security measures are required. The consumer device, in this example, is a consumer's mobile device and during interaction with the payment terminal, the mobile device communicates identification information to the payment terminal. Additionally, the consumer is prompted by the mobile device, typically upon receipt of instructions from the payment terminal, to enter either a PIN number or some other consumer input tending to identify the consumer. In some embodiments other types of security measures are used such as, but not limited to, biometrics, iris recognition, fingerprinting and the like.

As represented by block 130, once the consumer device and the payment terminal have established a connection, the payment terminal communicates transaction information to the consumer device. For example, a consumer may be purchasing goods from a cashier in a store. As the goods are scanned, the payment terminal communicates information related to the products being scanned, such as information indicating the name of the product being scanned and the price of the product being scanned. Once all the goods have been scanned at the point of sale in order to identify the goods, the payment terminal determines the balance owed for the transaction. Then, the payment terminal communicates transaction information including, but not limited to, product identification information, product quantity information, product pricing information, product discount information, running balance owed information, final balance owed information, and payment method information.

As represented by block 140, the consumer device then produces an audible transaction information signal based at least in part on some or all of the transaction information received from the payment terminal.

As represented by block 150, the listening device produces sound waves audible to the consumer based at least in part on the audible transaction information signal received from the consumer device. In some embodiments, the consumer device includes the listening device for audibly communicating the information to the consumer. In some embodiments, the consumer device includes a listening port such as a headphone jack so that the consumer may receive the audible information via headphones, headset, earphones, ear-buds, hearing assistance devices such as hearing aids or the like. In some embodiments, the listening device includes a personal listening device such as a set of headphones, a headset, earphones, ear-buds, hearing assistance devices such as hearing aids, one or more personal speakers or the like for connecting with the consumer device and providing audible sound waves to the consumer. In other embodiments, the listening device is a public listening device such as one or more public speakers or some other public listening device that publishes sound waves into surrounding areas so that any person proximate the area might listen. Herein a personal speaker refers to a low-output speaker configured for providing audible sound waves predominantly to an individual while minimizing public exposure to the sound waves. A public speaker refers herein to a speaker having a higher output than a personal speaker such that individuals other than the consumer may be exposed to the sound waves it produces. In the private listening embodiments, discretion is maintained because other nearby consumers need not become aware that the consumer is utilizing an audible transaction process 100. For example, as products are being scanned at the point of sale, the consumer device, which is connected with or includes a personal listening device, provides audible information to the consumer without nearby people being exposed to public messages concerning the transaction, thereby maintaining a high degree of discretion.

As represented by block 160, the consumer then completes the transaction. In some embodiments, the consumer device prompts the consumer to provide account information for payment of the balance owed. Then, the consumer may enter bank account information such as credit or debit account information. In some embodiments, the consumer device stores information regarding a particular credit or debit account from which the vendor can obtain payment. In such embodiments, the consumer device can be configured to prompt the consumer to choose the account from which the consumer desires payment to be made, or the consumer device can be configured to automatically provide payment from a predetermined account.

As used herein, a "bank account" refers to a credit account, a debit/deposit account, or the like. Although the phrase "bank account" includes the term "bank," the account need not be maintained by a bank and may, instead, be maintained by other financial institutions. As used herein, unless specifically limited by the context, a "transaction" may refer to a purchase of goods or services, a return of goods or services, a payment transaction, a credit transaction, or other transaction involving the consumer's bank account. As used herein, the term "products" refers to both goods and services.

FIG. 2 is a block diagram providing a more detailed illustration of an audible transaction system 200 in accordance with one embodiment of the invention. In general, the audible transaction system 200 includes a consumer 210 with a consumer device 215 and a vendor 220 having a point of sale 225 including a payment terminal 230. In the embodiment illustrated in FIG. 2A, the consumer device 215 is shown alongside the consumer 210 to indicate that the consumer device 215 is a mobile device that can be transported by the consumer 210. As discussed above, the consumer device 215 can be any number of mobile devices.

In this embodiment, the consumer device 215 includes a communication device 235, a processing device 240, a memory 245, and a listening device 250. In some embodiments, such as the embodiment discussed below with reference to FIG. 4, the consumer device includes a camera 252. In some embodiments, such as the embodiment discussed below with reference to FIG. 5, the consumer device is a mobile device and either includes or is configured for communicating with an input device 290 and a consumer-readable communication device 295. The processing device 240 is connected with and generally controls the operation of the other components of the consumer device 215.

As used herein, a "processing device" generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities.

As used herein, a "communication device" generally includes a modem, server, transceiver, and/or other device for communicating with other devices directly or via a network, and/or a user interface for communicating with one or more users. As used herein, a "user interface" generally includes a display, mouse, keyboard, button, touchpad, touch screen, microphone, speaker, LED, light, joystick, switch, buzzer, bell, and/or other user input/output device for communicating with one or more users.

As used herein, a "memory device" generally refers to a device or combination of devices including one or more forms of computer-readable media for storing instructions, computer-executable code, and/or data thereon. Computer-readable media is defined in greater detail herein below. It will be appreciated that, as with the processing device, each communication interface and memory device may be made up of a single device or many separate devices that conceptually may be thought of as a single device.

In the embodiment of the invention illustrated in FIG. 2, a processing device 255 is also located at the point of sale 225 and connected with the payment terminal 230. Some embodiments also have a display 257 connected with the payment terminal 230 and/or the processing device 255 for displaying some or all of the transaction information in a visually perceptible format. The processing device 255 is also connected with and controls a communication device 260 configured for communicating with a payment network 265. One of skill in the art will recognize, in view of this disclosure, that one embodiment of the payment network 265 includes communication pathways to and from both an acquiring bank, which manages the vendor's bank account, and an issuing bank, which manages the consumer's credit/debit account.

When the consumer 210 initiates a transaction, such as a payment transaction to pay for a product provided by the vendor 220, or a return transaction for returning a product to the vendor 220, the communication device 235 of the consumer device 215 establishes a connection (arrow 270) with the communication device 260 at the POS 225 of the vendor 220. In the wireless embodiment, this step typically begins with the processing device 240 controlling the communication device 235 so that the communication device 235 "listens" for communications from an outside communication device (such as 260) and/or transmits so that outside communication devices (such as 260) can recognize the presence of the consumer device 215. In one embodiment, radio frequency identification (RFID) devices are used as one or both of the communication devices 235 and 260 or are connected with one or both of the communication devices 235 and 260 to provide indications of the proximity of a consumer device 215 with a payment terminal 230. When communication device 235 recognizes the presence of a POS communication device 260, the connection can be established.

In other embodiments, the consumer device 215 connects via wired connection. For example, the consumer brings a consumer device 215 to the point of sale 225 and manually connects the consumer device 215 with the payment terminal 230 or the communication device 260. In one embodiment discussed above, the point of sale includes a communication device 260 such as a USB port and a USB cable for connecting with the USB port at the point of sale on one end and connecting with the consumer device 215 on the opposite end.

Once the consumer device 215 is connected with the payment terminal 230, the payment terminal 230 communicates transaction information to the consumer device 215 (arrow 275). The communication of transaction information may be prompted in several ways. In a first embodiment, the communication of transaction information is prompted automatically once both initiation of the transaction and a connection is established between the consumer device 215 and the payment terminal 230.

In a second embodiment, a consumer's card may prompt the audible transaction process once it has been swiped by the cashier or the consumer. The card may be swiped before or during the transaction process, and communicates to the payment terminal 230 that an audible transaction process is the consumer's preference. In one embodiment, the consumer's card is a credit/debit card that is being used to transfer account information for tendering payment for the transaction. In another embodiment, the consumer's card is a membership card such as a grocery store discount card. In various embodiments, the consumer card, (credit/debit card, membership card, or some other consumer card) has a memory such as a flash memory with stored consumer preferences indicating that an audible transaction process is preferred to the typical, visually-based transaction process. In various other embodiments, the consumer card indicates to the payment terminal 230, via access to an outside information source such as a remote database perhaps storing preferences for many consumers and maintained by the card-issuer, the consumer's preference for an audible transaction process. With regard to any of these embodiments, the consumer card may be swiped before or during the transaction and indicates to the payment terminal 230 the consumer's desire for an audible transaction process. It will be appreciated that, although a card is described herein, other devices may be used to indicate the consumer's preference for an audible transaction, such as other payment devices including, but not limited to, near-field-communication (NFC) payment devices. In one embodiment, the consumer device 215 is used as a NFC payment device and communicates the consumer's preference for audible transactions.

In a third embodiment, the consumer's preference for an audible transaction process may be prompted by the consumer plugging-in a personal listening device such as headphones, ear-buds or the like to the consumer device 215. When the consumer device 215 is already connected with a payment terminal 230 (arrow 270) upon connection of the personal listening device with the consumer device 215, the consumer device 215 indicates to the payment terminal 230 the consumer's preference for an audible transaction process, which is inferred from the consumer's plugging-in of the personal listening device. In another embodiment, the consumer device 215 prompts the consumer, either with a visual prompt, an audible prompt, a tactile prompt, or a combination of prompts, to choose whether to proceed with an audible transaction process once the personal listening device is connected. Then, the consumer device 215 receives the consumer input, either through speech recognition methods or via an input device, such as a keypad or touch-screen, and communicates the consumer's preference for proceeding with an audible transaction process if the consumer so chooses.

FIG. 3 is a block diagram providing a more detailed illustration of an audible transaction system 205 in accordance with another embodiment of the invention. In this embodiment, the consumer device 215 is located proximate the point of sale 225. In one embodiment, the consumer device 215 includes a pre-connected listening device 250, and in another embodiment, the consumer device 215 is configured for connecting with a listening device 250, such as a personal listening device. For example, in one embodiment, the consumer device 215 includes a headphone jack for connecting with a pair of headphones, which is one embodiment of the listening device 250.

When a consumer 210 initiates a transaction in this embodiment, the consumer 210 can prompt an audible transaction process in several ways. First, the consumer 210 can connect a listening device 250 with the consumer device 215 at the point of sale 225. The listening device 250 can be headphones, ear-buds or some other listening device. Second, the consumer 210 or the cashier can swipe the consumer's card or otherwise read the consumer's payment device or rewards device. As discussed above, the consumer's card can be a credit/debit card, a membership card, or the like. The card or other device either has stored preferences that are provided to the payment terminal 230 or is linked to pre-determined consumer preferences stored external to the system 205. Third, the system 205 can be configured to automatically operate with an audible transaction process. Fourth, the system 205 can prompt the consumer, audibly, visually or otherwise, to specify a preference by providing input either audibly or with some type of user input device such as a keypad, touch-screen or the like.

In another embodiment, the listening device 250 is already connected with the consumer device 215 at the point of sale 225. The listening device 250 in this embodiment can be one or more speakers, headphones, ear-buds or the like. In this embodiment, the second through fourth mechanisms of initiating an audible transaction process discussed above can be used. Specifically, the consumer 210 can swipe a card, indicating the consumer's preference, the system 205 can be automatically configured, or the system 205 can prompt the consumer 210 for input regarding preference.

FIG. 4 is a flow diagram illustrating a visual recognition audible transaction process 400. In this embodiment, the camera 252 of the consumer device 215 is configured for capturing video from the vendor's display 257 at the point of sale 225, as represented by block 410. As used herein the term "video" is an inclusive term intended to refer to one or more videos, one or more still images and/or one or more snapshot images taken from one or more videos. In some embodiments, the consumer device 215 is part of the vendor's point sale 225 as discussed with reference to FIG. 3, and the consumer device 215 includes a camera 252 for capturing the display 257. In other embodiments, the consumer device is separate from the point of sale 225, but the point of sale 225 includes a camera 252 connected with either the payment terminal 230 or the processing device 255 for capturing the video from the display 257. The video on the display 257 typically includes some or all of the transaction information.

For example, in one embodiment, the consumer device 215 includes a camera 252 for capturing the video display, as represented by block 410. The consumer 210 places the consumer device 215 within visual range of the vendor's display 257, and the camera 252 captures the video. The next step in the process, represented by block 420 is processing the video resulting in data representing the transaction information. This step is performed either by the consumer device 215 after capturing the video, or in embodiments where the camera 252 is part of the point of sale 225, by the processing device 255 at the point of sale 225. This may include performing an algorithm to convert any textual information captured from the display 257 into data representing the transaction information in an audible format. In this regard, some embodiments of the consumer device 215 include an image character recognition application stored in the memory 245 for processing video received from the camera, identifying transaction information therefrom, and converting the transaction information into an audio signal. In some embodiments, the camera 252 captures still images or screenshots from the display 257. In some of these embodiments, some or all captured still images are analyzed in order to discern any data representing transaction information.

The data representing the transaction information is then used to produce an audible transaction information signal as represented by block 430. Step 430 is performed by the processing device 240 of the consumer device 215 in embodiments where the camera 252 is part of the consumer device 215, and is performed by the processing device 255 at the point of sale in embodiments where the camera 252 is part of the point of sale 225. Finally, as represented by block 440, the audible transaction information signal is used to produce sound waves audible to the consumer 210. The listening device 250 receives the audible transaction information signal and produces sound waves audible to the consumer 210.

Referring now to FIG. 5, a flowchart of a mobile device consumer interface transaction process 500 in accordance with one embodiment of the invention is illustrated. As represented by block 510, a consumer initiates a transaction using a mobile device at a point of sale. As discussed above with reference to FIG. 1, the consumer approaches the point of sale carrying a device, which in this embodiment is a mobile device such as a cellular phone, smartphone, PDA, personal navigation device such as a GPS receiver, personal music player such as an MP3 player, or the like. The consumer then initiates a transaction by requesting purchase of goods and/or services.

As represented by block 520, the mobile device then interacts with a payment terminal at the point of sale to establish a connection, via either a wireless or wired connection as discussed above with reference to FIG. 1. When the mobile device is connecting wirelessly with the payment terminal, the connection can be initiated by either the mobile device or the payment terminal as discussed above. As discussed above with reference to FIG. 1, the interaction between the mobile device and the payment terminal includes authentication of the identity of the consumer in some embodiments.

As represented by block 530, once the mobile device and the payment terminal have established a connection, the payment terminal communicates transaction information to the mobile device. The transaction information may include, but is not limited to, product identification information, product quantity information, product pricing information, product discount information, running balance owed information, final balance owed information, and payment method information. In some embodiments, the transaction information also includes one or more requests for consumer input regarding some aspect of the transaction. For example, in one embodiment, as part of the transaction process, the vendor allows the consumer to request cash back to be drawn from the debit account the consumer is using to pay for a purchase of products. In this example, the transaction information includes information indicating that the cash back option is available and giving the consumer the option to choose whether he or she would like cash back. The transaction information, in some embodiments, also includes details concerning the cash back option such as the several levels of cash back from which the consumer will be allowed to choose.

As represented by block 540, the mobile device then produces a transaction information signal based at least in part on some or all of the transaction information and, in some embodiments, including information regarding one or more requests for consumer input regarding the transaction. In some embodiments, the payment terminal, rather than the mobile device produces the transaction information signal and then communicates the transaction information signal to the mobile device in conjunction or in place of step 530. In some embodiments, the transaction information signal is an analog signal and in others it is a digital signal or a combination of the two as discussed in greater detail below.

Next, as represented by block 550, the mobile device communicates some or all of the transaction information to the consumer using the transaction information signal by producing consumer-readable communications via the consumer-readable communication device 295 shown in FIG. 2. The transaction information signal, in some embodiments, includes instructions for producing consumer-readable communications. The instructions, in some embodiments, are digital instructions that can be processed and used to produce the consumer-readable communications. In other embodiments, the instructions are analog instructions that can be received by a consumer-readable communication device and used to produce consumer-readable communications without additional processing.

For example, in one embodiment, the payment terminal produces the transaction information signal in an analog format including instructions for a listening device such as a speaker. The payment terminal communicates the transaction information signal to the mobile device and the mobile device produces the consumer-readable communication, that is, sound waves audible to the consumer, via a speaker either integral or connected with the mobile device. In another embodiment, for example, the payment terminal produces the transaction information signal in a digital format including instructions for a tactile communication device such as a Braille device to produce a consumer-readable communication. The payment terminal communicates the transaction information signal to the mobile device, which then processes the signal and produces a consumer-readable communication using a tactile communication device either integral to the mobile device or connected with the mobile device.

The consumer-readable communications, in various embodiments, include one or more requests for consumer input regarding the transaction. In some embodiments, the request(s) is/are related to the transaction information, and in some embodiments, the requests are unrelated to the transaction information. For example, in some embodiments, the requests include requests for the consumer's personal information so that demographic information may be compiled and later analyzed.

As used herein, "consumer-readable communications" refers to any communication(s) produced by the consumer-readable communication device 295 of FIG. 2 and recognizable by the consumer via the consumer's senses. Such consumer-readable communications take many different forms, including, but not limited to visual communications such as video from a display of the mobile device, audible communications such as sound waves produced by a listening device, either personal or public, either part of the mobile device or separate, and tactile communications, such as those produced by a Braille-creating device, either part of the mobile device or separate. In some embodiments, the consumer-readable communications include communications intended to illicit a response from the consumer's sense of taste and/or sense of smell using a taste-creating device and/or a smell-creating device. In such embodiments, for example, the mobile device may include one or more chemical stores that are provided to the consumer based on the transaction information. For example, in one embodiment, the mobile device includes chemical stores for approximating the flavor and/or smell of two types of food products. The mobile device communicates with flavor and/or smell, and thereafter provides the consumer a choice between the two types of food products. In these various embodiments, the display, listening device, Braille-creating device, smell-creating device and/or taste-creating device are all examples of consumer-readable communication devices 295, but these examples are not exhaustive. Any device that produces a consumer-readable communication as defined above is considered a "consumer-readable communication device" as used herein.

As represented by block 560, the mobile device next receives consumer input including, but not limited to, consumer response to the one or more requests included in the consumer-readable communications of step 550. Consumer input is received via input device 290 shown in FIG. 2. The input device 290 may be part of the mobile device or may be separate and configured for communicating with the mobile device. The input device 290, in various embodiments, includes or is a keyboard, a touch-screen, a roller-ball, one or more buttons, a microphone configured for receiving audible input, a mouse, a touch-pad, an eye-movement sensing device configured for receiving input such as a pair of eye-glasses for measuring eye movement, one or more motion sensing devices such as one or more accelerometers configured for receiving input based on movement of the input device by the consumer, or any other device configured for receiving consumer input. For example, in one embodiment, the mobile device has communicated to the consumer by producing a consumer-readable communication (step 550) the option for cash-back during the course of a pending transaction. The consumer is prompted, via the consumer-readable communication, to input the consumer's choice whether to receive cash back. The consumer is given the option of choosing "yes" or "no." In some embodiments, the consumer-readable communication indicates to the consumer that his or her answer may be spoken. In others, the communication indicates to the consumer that his or her answer may be typed into a keyboard or touch-screen device or entered physically in some other manner. The mobile device then receives the consumer's input regarding whether the consumer prefers cash back during the transaction.

In some embodiments of the process 500, as represented by arrow 565, several steps are repeated based on the interaction between the consumer, the mobile device and the payment terminal. For example, in some embodiments, steps 530-580 are repeated one or more times.

As represented by block 570, once the mobile device has received consumer input, the mobile device communicates to the payment terminal the consumer input including, but not limited to, consumer response to the one or more requests. Next, as represented by block 580, the payment terminal processes the consumer input. For example, in one embodiment, the payment terminal processes the consumer input indicating a positive desire for cash back. The payment terminal determines that the process should revert to step 530 in order to communicate the cash back levels available to the consumer and receive consumer input regarding desired level. In some embodiments, once all necessary iterations of the process have been completed, the mobile device communicates to the consumer that the transaction has been completed as represented by block 590.

In one exemplary embodiment of the invention described above with reference to FIGS. 2 and 5, the payment terminal is configured to communicate information to the mobile device that can be used by the mobile device to present the same information to the consumer through user interface devices integral with or coupled to the mobile device as is or would otherwise be presented to the consumer through the payment terminal display or other user interface devices. In some embodiments, this information presented to the consumer requires a response from the consumer and the consumer can enter the response using the user interface device (s) integral with or coupled to the consumer's mobile device. In this way a consumer with a sensory impairment may be able to use his or her own device, which may be specially configured or at least familiar to the consumer, to receive and send communications to and from the payment terminal.

For example, in one embodiment, a consumer having a visual impairment is checking out at a grocery store and, when it is time to make payment, the payment terminal communicates wirelessly with the consumer's cell phone information including the total purchase amount and a request to select a method of payment from several available options. The consumer's cell phone may generate an audio signal to present this information to the consumer through headphones coupled to the cell phone. In response, the consumer may use the familiar keypad of the consumer's cell phone or a voice recognition feature of the cell phone to make a selection of a payment method. The cell phone then communicates the selection to the payment terminal. The consumer may then swipe a debit or credit card through a card reader of the payment terminal and, in response, the payment terminal may send a signal to the consumer's cell phone that causes the cell phone to present audio to the consumer asking the consumer to enter a personal identification number (PIN). The consumer can then use the cell phone's user input devices to enter a PIN.

In some embodiments of the invention, the payment terminal always wirelessly communicates the same information that is presented through its display or other consumer interface devices within some small radius of the payment terminal and always enables a mobile device in that radius to communicate consumer input back to the payment terminal. In other embodiments, however, communication between the consumer's mobile device and the payment terminal is only triggered by some event, such as input by a customer service person at the point of sale or recognition of a consumer preference associated with the consumer's rewards card or bank card.

In some embodiments of the invention, the payment terminal communicates the same information to the consumer's mobile device that is displayed to the consumer on the point of sale's display so that the information can be presented to the consumer using both the point of sale's display and the mobile device. In other embodiments, however, the payment terminal does not display the information on the payment terminal's display if the information is instead communicated to the consumer's mobile device. Likewise, in some embodiments of the invention, the payment terminal can receive consumer input from either the consumer's mobile device or the point of sale's user input devices, while, in other embodiments, the payment terminal can only receive certain consumer input from the mobile device once communication is initiated between the consumer's mobile device and the payment terminal.

Referring now to FIG. 6, a flowchart of a process for providing a consumer a modified transaction process or session 600 is illustrated. First, as represented by block 610, a transaction device is carried by a consumer to the point of sale of a vendor and includes data indicating the consumer's preference for a modified transaction process such as one or more of the audible transaction process 100, the visual recognition audible transaction process 400, the mobile device consumer interface transaction process 500 each discussed above, or another modified transaction process.

A "transaction device" as used herein refers to any device used by the consumer to transfer or point to information useful to the vendor during a transaction proximate a point of sale. The term is intended to be read broadly to include many different types of devices such as loyalty devices, mobile devices, payment devices, and any other devices carried by a consumer during a transaction proximate a point of sale. When used herein, the term "payment device" is used synonymously with "transaction device" and is intended to include not only payment devices but also any other type of transaction devices as defined above. Examples of transaction or payment devices as used herein include, but are not limited to, loyalty devices such as loyalty cards or other loyalty devices, magnetic-based payment devices such as credit cards, debit cards, and the like, personal identification number (PIN) payment devices, contactless payment devices such as key fobs, radio frequency identification devices (RFID) and the like, and mobile devices such as smartphones, cellular phones, personal digital assistant (PDA) devices, MP3 devices, personal GPS devices and the like.

In some embodiments, the payment device includes a consumer preference device that stores consumer preference data corresponding to one or more consumer preferences regarding transaction sessions or other preferences. For example, in some embodiments, a consumer preference device may include one or more of a memory device, a communication device such as an RFID or a magnetic-based communication device such as a magnetic strip or the like. The consumer preference device is configured for communicating the consumer preference data to the payment terminal at the point of sale as discussed further below.

In other embodiments, the payment device includes a consumer preference device that stores pointer data indicating the location where consumer preference data is stored as discussed further below with reference to block 640 and FIG. 8. For example, in one embodiment, the pointer data includes a network address such as an address of a remote database at which the payment terminal can request the consumer preference data. Once the payment terminal has requested the consumer preference data, the remote database communicates the consumer preference data across the network to the payment terminal.

As represented by block 620, the payment device interacts with an input device of a payment terminal proximate the point of sale in order to establish a connection between the payment device and the payment terminal. Next, as represented by block 630, the payment device communicates the consumer preference data to the payment terminal. In some embodiments, the consumer preference data includes information indicating the consumer preference regarding a modified transaction process. In some other embodiments, the payment device communicates consumer preference data including pointer data including information indicating a network location of remote preference data. In these embodiments, the remote preference data indicates the consumer preference regarding a modified transaction process.

In yet other embodiments, the consumer preference data includes both information indicating the consumer preference regarding a modified transaction process and pointer data. The pointer data in such embodiments includes information indicating a network location of remote preference data that includes additional information regarding the consumer's preference regarding a modified transaction process. For example, in some embodiments, the consumer preference data indicates that a consumer prefers an audible transaction process 100 and also includes pointer data. The pointer data indicates the location of remote preference data, which indicates the additional consumer preferences regarding the audible transaction process 100 an the additional consumer preference for a visual recognition audible transaction process 400 in some embodiments or a mobile device consumer interface transaction process 500 in some embodiments or both in other embodiments.

As represented by block 640, the processing device of a payment terminal processes the consumer preference data to determine whether a modified transaction session is preferred by the consumer. In embodiments where pointer data is included with the consumer preference data, step 640 includes several sub-steps as discussed with reference to FIG. 8 below.

As represented by block 650, the processing device of the payment terminal modifies the transaction session based on the determined consumer preference regarding a modified transaction session. If, in step 640, it is determined the consumer prefers one or more modified transaction processes, the payment terminal modified the transaction to correspond to the consumer's preference. For example, in one embodiment, the consumer indicates to the consumer's bank his or her preference for an audible transaction process 100 during every transaction at points of sale. The bank issued a payment device having a consumer preference device such as a credit card having an embedded flash memory storing consumer preference data indicating the consumer's preference for an audible transaction process 100. For example, in another embodiment, the bank issues a credit card having an embedded flash memory storing consumer preference data including pointer data. When the credit card is read by an input device at the vendor's payment terminal or point of sale, the credit card communicates the consumer preference data including the pointer data to the payment terminal or point of sale. The payment terminal or point of sale then initiates the process discussed further with reference to FIG. 8 including retrieving and processing remote preference data. Once the consumer's preference for one or more modified transaction processes is determined, the payment terminal or point of sale modifies the transaction to accommodate the consumer's preference.

In some embodiments, the consumer's preference is for a modified transaction session throughout the entire transaction and in other embodiments, the consumer's preference is for a modified transaction session during only certain portions of the transaction. In some embodiments, the payment device communicates with the payment terminal at the point of sale before a transaction, in other embodiments during a transaction, and in others after a transaction. The consumer preference data in some embodiments includes the consumer preference for a modified transaction process during or throughout the present transaction and in others, includes the consumer preference for a modified transaction process in one or more future transactions.

FIG. 7 is a block diagram providing a more detailed illustration of a system 700 for providing a consumer with a modified transaction process in accordance with another embodiment of the invention. The consumer 710 carries a payment device 715, which in some embodiments, includes a consumer preference device 717. As discussed above, the consumer preference device may include one or more of a memory device, a communication device such as an RFID or a magnetic-based communication device such as a magnetic strip or the like. The vendor 720 has a point of sale 725 which includes a payment terminal 730. An input device 732 interacts with the payment device 715 carried by the consumer in order to receive the consumer preference data regarding consumer preference for one or more modified transaction processes. As represented by arrow 735, the consumer preference data is communicated from the payment device 715 to the vendor 720 input device 732. A processing device 750 processes the consumer preference data in order to determine the consumer's preference regarding one or more modified transaction processes. In some embodiments, as discussed elsewhere, a communication device 760 communicates with a network 765 in order to retrieve remote preference data from a network location that was determined by processing the consumer preference data. Once it is determined the consumer prefers one or more modified transaction processes, modified transaction information is communicated from the vendor to the consumer as represented by arrow 740. Arrow 745 represents communication of payment account information from the consumer to the vendor during the transaction. Such information and other transaction interactions between the consumer and the vendor may be modified based on the consumer's preference for a modified transaction process.

In some embodiments, the payment device is not an "active" device that produces any type of communication, but rather, is a "passive" device that can be read by the payment terminal or point of sale. For example, in one embodiment, the payment device is or includes an RFID that can be detected by the input device at the payment terminal or point of sale. The RFID, in some embodiments, simply indicates a value such as a positive or negative value. In such embodiments, the input device is configured for recognizing and processing the value to indicate the consumer's preference for a particular modified transaction process. For example, the RFID indicates a positive value and the input device recognizes the positive value indicates the consumer's preference for an audible transaction process 100. Thus, the audible transaction process is initiated. In another example, the RFID indicates a positive value in addition to pointer data. In this example, the payment terminal retrieves the remote preference data and processes the data to determine the type of modified transaction process the consumer prefers. In yet other embodiments, the "passive" device may indicate consumer preference data including one or more positive or negative values corresponding to one or more modified transaction processes or may indicate one or more pieces of pointer data.

In other embodiments, the payment device is an "active" device that actively communicates the consumer preference data either automatically or upon recognizing the proximity of a payment terminal or point of sale input device.

Referring now to FIG. 8, a flowchart of processing the consumer preference data 680 is illustrated in accordance with one embodiment of the invention. As represented by block 810, the processing device determines whether the consumer preference data received from the payment device carried by the consumer includes pointer data. If the processing device determines the consumer preference data does not include pointer data, then the process 680 of FIG. 8 is exited and the processing device modifies the transaction session based on the consumer preference determined from the consumer preference data, if any (see 650 of FIG. 6). On the other hand, if the processing device determines the consumer preference data includes pointer data, the communication device accesses the network location indicated by the pointer data as represented by block 820. Next, as represented by block 830, the communication device retrieves the remote preference data accessed at the network location indicated by the pointer data. Finally, as represented by block 840, the processing device processes the remote preference data to determine the consumer's preference regarding one or more modified transaction sessions.

Referring now to FIG. 9A, another embodiment of a vendor's 220 point of sale 900 is shown. The point of sale 900 includes, in the embodiment shown, a processing device 255 connected with a terminal 910A and a communication device 260. The terminal 910A includes a consumer interface 920A that, in some embodiments, is an interactive display device for example, a touch screen configured for displaying information regarding the transaction such as a running total of amount due for payment and a description of the goods and/or services to be purchased. Generally, such touch screen consumer interfaces 920A accept consumer input by sensing the consumer depress specific portions of the screen corresponding to on-screen prompts for input or options cordoned-off on the screen as virtual buttons (referred to herein as "touch screen inputs"). For example, in one application, the touch screen displays several touch screen inputs providing the consumer the opportunity to make selections regarding a desired amount of cash back, e.g., $20, $40, $60, $80, and $100. The touch screen senses the consumer depress the portion of the screen corresponding to the consumer's choice, for example $20, and notifies the terminal 910A of the consumer's choice for processing and completion of the transaction.

The illustrated embodiment of the consumer interface 920A includes a permanent tactile overlay 930A covering the screen of the display. The tactile overlay 930A defines one or more depressions or apertures (collectively referred to herein as "overlay inputs") 940A configured to correspond with the touch screen inputs. The tactile overlay 930A provides a consumer the ability to sense the overlay inputs 940A by feel and thereby discern the location of an underlying touch screen input. The consumer can feel the overlay inputs 940A because they are a different height or depth with regard to the screen than the overlay itself. Once the consumer has discerned the location of the overlay input 940A corresponding to his or her chosen input as discussed in further detail below, the consumer can touch the screen through the tactile overlay 930A to provide tactile input to the terminal 910A. In embodiments where the overlay inputs 940A are depressions in the tactile overlay 930A, once the consumer has discerned the location of the desired input, the consumer can depress the overlay input 940A itself and thereby provide tactile input to the screen and the terminal 910A.

Referring now to FIG. 9B, another embodiment of a terminal 910B at a vendor's 220 point of sale 900 is shown. The terminal 910B includes a consumer interface 920B, which is or includes a display having a touch screen for accepting consumer input regarding a point of sale transaction. Another embodiment of a permanent tactile overlay 930B covers some or all of the screen of the consumer interface 920B. The tactile overlay 930B includes overlay inputs 940B for receiving pressure from a consumer, such as from the consumer's finger, and transferring the pressure to the underlying touch screen so that a corresponding touch screen input is chosen and communicated to the terminal 910B. In some embodiments, the overlay inputs 940B have a different textural surface than the surface of the surrounding portions of the tactile overlay 930B thereby providing the consumer the opportunity to feel and distinguish the location of the overlay inputs 940B from the other surfaces of the tactile overlay 930B. For example, in one embodiment, the surface of the tactile overlay 930B surrounding the overlay inputs 940B is generally smooth whereas the surfaces of the overlay inputs 940B themselves are rough, and in another embodiment, the surfaces of the overlay inputs 940B are relatively smooth and the surface of the tactile overlay 930B surrounding the overlay inputs 940B is relatively rough. In one embodiment, the overlay inputs 940B include or are protrusions 950 such as knobs of various shapes or ridges raised from the surface of the tactile overlay 930B and/or the surface of a raised overlay input 940B. Such overlay inputs 940B, are structurally deformable so as to make physical contact with the underlying touch screen thereby providing tactile input to the touch screen for communicating to the terminal 910B.

Referring now to FIG. 10A, another embodiment of a consumer interface 1020A of a point of sale terminal is shown. The consumer interface 1020A is or includes a display having a touch screen for accepting consumer input regarding a point of sale transaction. A removable tactile overlay 1030A is shaped to fit over the top of the consumer interface 1020A in the direction of arrow 1060A such that the overlay inputs 1040A are positioned to provide the consumer with tactile assistance for submitting input to the consumer interface 1020A. In the embodiment shown, the tactile overlay 1030A has been manufactured to fit snugly on top of the display with little or no space between the display and the overlay. Such a snug fit ensures the overlay remains securely attached to the display such that the overlay inputs 1040A remain in an accurate position for corresponding with the touch screen inputs. In other embodiments, the overlay is manufactured to fit less snugly, which provides the consumer assistance in installing the overlay on the display. In various embodiments, the overlay includes attachment aides, and in some embodiments, the attachment aides are coupling aides installed on the overlay with corresponding coupling aides installed on the display. For example, in one embodiment, the overlay includes snaps, and in another embodiment, for example, the overlay includes Velcro® aides or the like for removably securing the overlay to the display, thereby ensuring the overlay remains in an accurate position. In various other embodiments, the overlay includes one or more magnets, one or more straps, one or more corresponding protrusions and apertures or the like.

In some embodiments, the tactile overlay 1030A surrounds the entire display, that is, the overlay 1030A has a front 1032, two sides 1034A and 1034B, and a back 1036 that in combination totally surrounds the display. As shown, however, the overlay 1030A does not extend vertically down to the bottom of the display, but rather only covers a portion of the display. In other embodiments, the tactile overlay 1030A extends vertically downward to cover the entire display. In other embodiments, the tactile overlay 1030A does not extend entirely around the display, but rather only partially surrounds the display. For example, in one embodiment, the tactile overlay 1030A includes a front 1032 and two sides 1034A and 1034B for attaching to the display but does not have a back. This embodiment allows the consumer additional ease in attaching the flexible overlay. In some embodiments such as those wherein the overlay does not include a full back, the two sides of the overlay extend partially around the back of the display for securing the overlay to the display. In one embodiment, for example, the display includes receivers or coupling aides on the back of the display configured for receiving and securing the side extensions of the overlay. For example, in one embodiment, the overlay includes an elongate extension having an elongate ridge or protrusion configured for fitting into and coupling with a depression or trough defined in the back of the display. For example, in another embodiment, side extensions include one or more hooks that couple with one or more hook receivers attached to the back of the display. In some embodiments, the overlay is flexible such that stretching the overlay in some instances better enables attaching the overlay to the display.

Referring now to FIG. 10B, another embodiment of a removable tactile overlay 1030B is shown. The overlay is attached to the consumer interface 1020B by moving the overlay in the direction of arrow 1060B. As discussed above with reference to FIG. 10A, various embodiments of overlay 1040B include, for example, overlays that extend entirely around the display and those with less than complete coverage of the display. In the shown embodiment, the overlay 1030B only partially covers the display in the horizontal direction.

In some embodiments of the point of sale terminal, multiple removable overlays, such as 1030A and 1030B are used in conjunction with one another. For example, in one embodiment, the overlay 1030B shown in FIG. 10B is used in conjunction with another, similar overlay (not shown) that is installed on the opposite side of the display by moving it over the display in a direction opposite to arrow 1060B. In various similar embodiments, the multiple overlays used in conjunction differ from one another in various ways. For example, the overlays used in conjunction, in various embodiments, include different or no attachment aides, include different numbers, arrangements and types of overlay inputs 1040B. In various other embodiments, one or more permanent overlays, such as overlays 930A and 930B are used in conjunction with one or more removable overlays, such as overlays 1030A and 1030B.

In other embodiments the removable tactile overlay includes only one, two or three sides. For example, in one embodiment, the removable tactile overlay includes only one side, that is, the front side that fits onto the screen of the display. In such an embodiment, the overlay is attached to the screen. For example, in one embodiment, the overlay includes adhesive, and in other embodiments, various other attachment aides are used as discussed elsewhere in the disclosure.

In various embodiments of the tactile overlay 930 or 1030, a front portion of the tactile overlay 930 or 1030 corresponding with the front of the touch screen display has a "front portion tactile characteristic." The one or more overlay inputs 940 or 1040 disposed on the front portion of the tactile overlay 930 or 1030 and configured for corresponding with the one or more touch screen inputs displayed on the touch screen display provide the consumer an "overlay input tactile characteristic." The front portion tactile characteristic and the overlay input tactile characteristic represent tactile characteristics associated with the main portion or front portion of the tactile overlay 930 or 1030 and the overlay inputs 940 or 1040, respectively. The front portion tactile characteristic and the overlay input tactile characteristic are distinct from one another such that the consumer can differentiate between the two. This allows the consumer the ability to feel the position of the overlay inputs 940 and 1040 from the position of the remainder of the front portion of the tactile overlay and effectively use the overlay inputs 940 and 1040 to provide input to the touch screen display. In some embodiments, as discussed elsewhere herein, the front portion tactile characteristic and the overlay input tactile characteristic include differentiable levels of one or more of the following characteristics: texture, where one characteristic is more smooth or more rough than the other; depth, that is, where one characteristic is deeper or higher than the other; shape, that is, where one characteristic is shaped differently than the other. In addition, the front portion tactile characteristic and the overlay input tactile characteristic can include any other characteristic or feature detectable by feel or tactile sense.

In various embodiments such as those shown in FIGS. 9A, 9B, 10A, and 10B and other embodiments as discussed herein, the tactile overlay 930 is made from a transparent material so that the parts of the screen covered by the tactile overlay 930 are visible to the consumer through the tactile overlay 930. In other embodiments, only portions of the tactile overlay 930 are transparent, and in yet other embodiments, the tactile overlay or portions thereof are only partially transparent. In some embodiments, some or all the tactile overlay 930 is opaque or partially opaque. In various embodiments, the overlay inputs 940 are arranged in a configuration on the right-hand side of the screen, but in other embodiments, the overlay inputs 940 are arranged in various configurations and locations on the tactile overlay 930 and thereby the screen.

Furthermore, in various embodiments, the overlay inputs 940 include one, two, three, four, or any other number of inputs. In the embodiments shown in FIGS. 9A, 9B, 10A, and 10B, the overlay inputs 940 are twelve in number, and in some consumer transaction applications, such as those requiring input of numerical digits, such a configuration of overlay inputs 940 corresponds with a traditional numerical keypad including digits zero through nine as well as the asterisk and the pound characters. In other embodiments, the overlay inputs 940 are arranged in various other ways and include various numbers of inputs corresponding to other input characters, such as any other alpha-numeric characters, arithmetic characters or the like. In some embodiments, and in fact, embodiments where the arrangement of overlay inputs 930 corresponds to a particular combination of characters or inputs (such as the numerical keypad example discussed above), the overlay inputs 930 can also be used for the customer to provide input related to many different topics such as, for example, input regarding the amount of cash back requested. The overlay inputs 940 allow the consumer to view the touch screen behind the tactile overlay 930 and accordingly, any application requiring touch screen input can be configured to utilize a tactile overlay 930. In some embodiments where the location of the touch screen inputs is currently known, the arrangement, size and number of overlay inputs 940 on the tactile overlay 930 can be predetermined so that the tactile overlay 930 corresponds effectively with the pre-implemented point of sale terminal 910 configuration. However, in other embodiments, the tactile overlay 930 configuration is designed in conjunction with computer executable instructions being executed by the processing device 255 for controlling the terminal and the coordinating the point of sale transaction. As such, the tactile overlay 930 configuration corresponds seamlessly to the required touch screen inputs.

Referring back to the example discussed above, the consumer is given several cash back options and the tactile overlay 930 is configured to provide overlay inputs 940 corresponding to the virtual buttons on the screen for the various amounts of cash back displayed on the screen. In some embodiments, the tactile overlay 930 completely covers the screen (other than the overlay inputs 940) and in other embodiments, the tactile overlay 930 only covers a portion of the screen, such as the right half of the screen, the left half of the screen, the right third of the screen, the left third of the screen, the top half of the screen, the bottom half of the screen, a portion of the middle of the screen, or the like.

The overlay inputs 940 in the embodiments of FIGS. 9A, 9B, 10A, and 10B provide the consumer a tactile sense of the proper location for providing input to the terminal 910A by touching the tactile overlay 930 and/or the underlying screen. That is, when a consumer attempts to make a choice regarding a transaction, the tactile overlay 930 enables the consumer, familiar with the tactile overlay 930, to make the proper choice. For example, the consumer can determine the location of the uppermost, left-hand overlay input based on no other overlay inputs being located farther left or above the uppermost, left-hand input. Accordingly, the consumer has a point of reference for the entire set of overlay inputs 940.

The permanent tactile overlay 930 and the removable tactile overlay 1030 are, in various embodiments, rigid and inflexible, manufactured to conform closely to the underlying consumer interface, display or touch screen. In various other embodiments, the tactile overlay 930 and 1030 are flexible and stretchable such that the consumer can install the tactile overlay 1030 more easily. Such flexibility also might assist the consumer carrying the tactile overlay 1030 to fold the tactile overlay 1030 or otherwise reduce its overall size for transport. The tactile overlay 930 and 1030, in some of the flexible embodiments, is manufactured using one or more of rubber, plastic, rubber composites, plastic composites, combinations of the same or any other flexible, and in some cases, stretchable and transparent materials.

In some embodiments of the terminal, the tactile overlay 930 and/or 1030 is used in combination with the various methods and systems disclosed herein. For example, the tactile overlay 930, in various embodiments, is used in conjunction with one or more of the audible transaction process 100, the visual recognition audible transaction process 400, the mobile device consumer interface transaction process 500 and the modified transaction process 600. In one embodiment, the tactile overlay 930 or 1030 is used along with the audible transaction process 100 such that the point of sale 900 communicates to the consumer directions regarding use of the tactile overlay 930 to assist with completing the transaction. For example, one audible communication provided by the point of sale 900 to the consumer includes information regarding the touch screen inputs corresponding with one or more of the overlay inputs 940 or 1040. In this regard, the consumer becomes oriented to the tactile overlay 930 and, in cases where the consumer is visually impaired, receives a reference overlay input 940 for proceeding with the transaction. From the reference overlay input 940, the consumer can discern the function of the various other overlay inputs 940. In another example, the audible communication provided by the point of sale 900 includes directions through the transaction including directions for every overlay input 940 such that, when the consumer is required to make a choice, the consumer need not recall the association of the various overlay inputs 940, but rather, can rely on the audible transaction process 100 to instruct them with regard to the function of the various overlay inputs 940 throughout the transaction as needed. In a specific example of using the audible transaction process in conjunction with the tactile overlay 930, the consumer carries a set of headphones and plugs the headphones into a headphone jack at the point of sale 900. The terminal 910 communicates instructions through the headphones to the consumer for using the tactile overlay 930 for completing the transaction. In another embodiment, the mobile device consumer interface transaction process 500 is used in conjunction with the tactile overlay 930 or 1030. For example, the consumer's mobile device, which is in communication with the point of sale 900, communicates to the consumer directions for using the tactile overlay 930 or 1030. In yet another embodiment, the tactile device 930 or 1030 is used in conjunction with the modified transaction process 600 such that the transaction is modified to provide the tactile overlay 930 or 1030.

Referring now to FIG. 11, a flowchart representing a process for an automatic tactile overlay transaction modification is illustrated. In step 1110, the consumer indicates to the vendor the consumer's preference for a tactile overlay transaction modification at the point of sale of the vendor. In some embodiments the consumer interface 920A is configured for receiving consumer input regarding the consumer's desire to use a tactile overlay 930 during the transaction, and in other embodiments, various other consumer input methods are used. For example, in one embodiment, the consumer's payment device is used to modify the transaction using the modified transaction process 600. At step 1120, an automatic tactile overlay installs on the consumer interface 920 in such a manner that the tactile overlay is properly positioned to provide the consumer tactile assistance with entering input corresponding to the touch screen inputs.

In one embodiment, for example, the tactile overlay 1030 is connected to the consumer interface 1020 on a track with a powered motor for moving the tactile overlay 1030 into proper position once initiated by the consumer. One example of this embodiment is a configuration similar to that shown in FIG. 10A wherein the tactile overlay 1030A remains above the display while not in use. When the tactile overlay 1030 is in such a configuration, it is referred to herein as being in a "non-assistance position," because the tactile overlay 1030 is not positioned such that the one or more overlay inputs 1040 are positioned proximate the corresponding one or more touch screen inputs. Therefore, in the non-assistance position, the tactile overlay 1030 does not assist the consumer during the transaction. On the other hand, when the tactile overlay 1030 is moved into a "tactile assistance position," the tactile overlay 1030 is positioned such that the one or more overlay inputs 1040 are positioned proximate the corresponding one or more touch screen inputs. Therefore, when the tactile overlay 1030 is in the tactile assistance position, the tactile overlay 1030 can assist the consumer during the transaction.

Once initiated by the consumer, the tactile overlay 1030 is lowered by an electro-mechanical system, in one embodiment, which includes, for example, a track for guiding the tactile overlay, in cooperation with a drive such as a motor for lowering the tactile overlay into position. In another embodiment, for example, the tactile overlay 1030 resembles a widened belt that is stretched across two or more rollers such that when the consumer indicates a preference for the tactile overlay, a person can position the tactile overlay manually by turning one or more of the rollers, or in some embodiments, the rollers are automatically controlled and adjusted based on consumer initiation. In yet another embodiment, the tactile overlay is not belt-like, but rather, is a sheet attached at both its ends to rollers such that it can be rolled onto one or both rollers as initiated manually by the consumer or automatically by an electro-mechanical system. Referring back to FIG. 11, finally at step 1130, the transaction proceeds with the consumer using the tactile overlay 1030 for assistance providing input to the point of sale.

Referring now to FIG. 12, another embodiment of the vendor's 220 point of sale 900 is illustrated. The point of sale 900 includes a processing device 255, terminal 910 and communication device 260. The terminal 910 includes a consumer interface 920 having either a removable or permanent tactile overlay 930 or 1030. In this embodiment, the vendor also has a tactile overlay information kiosk 1210, which in some embodiments, is part of the point of sale 900, and in others, is separately located and distinct from the point of sale 900. The kiosk 1210 provides the consumer information and instructions for using the tactile overlay 930 or 1030. For example, in the case of the consumer being visually impaired, the kiosk 1210 provides useful information detailing the configuration of the point of sale 900 including information concerning how to implement use of the tactile overlay 930 and/or how to use the tactile overlay 930 during a point of sale transaction. In some embodiments, the kiosk 1210 includes one or more speakers connected to a processing device, such as processing device 255 for playing one or more audio messages to a consumer seeking guidance before attempting a transaction using the tactile overlay 930. In some embodiments, the kiosk 1210 includes a kiosk interface for interacting with the consumer, and in some embodiments, the kiosk 1210 itself includes a tactile overlay 930 for interacting with the consumer and teaching the consumer the proper method for using the tactile overlay 930.

In some embodiments, the kiosk 1210 is physically located separate from the terminal 910 so as not to draw unnecessary attention to any consumer using the kiosk 1210. Also, locating the kiosk 1210 away from the terminal 910, such as near the entrance to a vendor's space, provides the consumer the opportunity to receive instruction upon entering the space and before facing a point of sale transaction, such as for example after shopping for groceries. Receiving instructions before being confronted with a check-out line at a vendor's point of sale 900 can help to streamline the point of sale transaction process thereby providing additional discretion in the case of a consumer with visual impairment.

In some embodiments, a set of removable overlays 930 is provided at the point of sale 900 or can be carried by the consumer. The set of overlays 930, in one embodiment, includes multiple overlays 930 each corresponding to different configurations of touch screen inputs on the display of the consumer interface 920. In other words, when the information on the touch screen display changes such that the touch screen inputs change locations, functions, shapes, or the like, a different overlay, correctly providing tactile assistance, can be installed. Such installation, in some embodiments, is automatic. For example, in one embodiment, the set of overlays 930 is included on a reel of overlays 930 turning on one or more rollers driven by an electromechanical drive. In some embodiments, the set of overlays 930 is manually installed on the consumer interface 920 by a cashier, the consumer or both. For example, in one embodiment, the set of overlays 930 includes one or more overlays corresponding to screens configured for providing cash back to the consumer, providing authentication to one or more accounts, providing instructions to the consumer regarding the transaction or using the tactile overlay, and the like. The cashier, in this example, changes the overlay in order to conform with the stage of the transaction.

In some embodiments of the set of overlays 930, the multiple overlays 930 are physically attached to the consumer interface 920, such as, for example, by way of a set of rings allowing each overlay to be flipped or turned to cover the touch screen display. In one embodiment, for example, the set of overlays 930 include multiple overlays 930 configured for flipping to cover the touch screen display in succession such that the first overlay covers the display for initial consumer assistance, and as the transaction progresses, the second overlay is flipped to cover the display and the first overlay as necessary. In some such embodiments, a third overlay is flipped to cover the display and the first and second overlays 930. In various other embodiments, any number of overlays are included in the set and are flipped to cover the display and the previously flipped overlays. In another embodiment, all the overlays are initially covering the display, and as the transaction progresses, the top overlay is flipped off of the display and the other overlays such that the surface of a second overlay is exposed for providing tactile assistance. As the transaction progresses, the second and additional overlays are turned in conjunction as appropriate to correspond with progression of the transaction.

In embodiments including multiple, overlays 930, typically the overlays are manufactured such that the consumer can discern the overlay inputs 940 of the outermost overlay 930 without feeling the overlay inputs 940 of the underlying overlays 930. However, in other embodiments, the overlays 930 are manufactured such that inputs 940 from multiple overlays 930 are discernable simultaneously. In one such embodiment, for example, the uppermost overlay 930 includes a textural difference between overlay surface and input, and the overlay immediately underneath the uppermost overlay includes protrusion inputs. In one application, the protrusion inputs provide additional tactile feedback to one or more of the textural inputs of the uppermost overlay. In this regard, one overlay input area, that is, the area discernable from the surrounding surface of the overlays can include multiple tactile indicators such as a textural indicator as well as a protrusive indicator. As such, the consumer can discern a difference between such an input and one, for example, that merely includes a textual indicator absent a protrusive indicator.

In some embodiments of the overlay 930, including some having a set of overlays 930, the overlay(s) 930 are configured so as not to actuate the touch screen inputs until the consumer intends to actuate the touch screen inputs. Specifically, the consumer is able to feel the overlay with a relatively low amount of pressure in order to discern the relative location and feel of the overlay and the overlay inputs without actuating a touch screen input. Once the consumer decides to provide input, the consumer can then apply additional pressure to the overlay(s) 930 to actuate the chosen touch screen input. In some embodiments, the overlay 930 is made from a material allowing a small amount of pressure to compress the material without actuating a touch screen input, and once the consumer applies additional pressure, the overlay material transfers sufficient pressure to the touch screen to actuate the chosen touch screen input. In another embodiment, the overlay is manufactured such that a slight space remains between the overlay and the touch screen, or in various embodiments, the overlay includes multiple layers having one or more spaces included between the layers or multiple layers having different hardnesses configured for absorbing, without transferring, the consumer's initial pressure and configured for transferring the consumer's greater pressure for choosing a touch screen input.

In various embodiments of the overlay 930 or 1030, the overlay inputs 940 or 1040 are arranged in a grid or known configuration. In some embodiments, the point of sale 900 provides the consumer audio messages instructing the consumer regarding the appropriate location or quadrant within the grid to find the appropriate overlay input for providing appropriate tactile input to the corresponding touch screen input. Such audio instruction, in various embodiments, can be provided in a number of ways such as those discussed above regarding the audible transaction process. For example, in one embodiment, the consumer is involved in a transaction at a point of sale and is using headphones plugged into the point of sale terminal to receive audible instructions assisting with the transaction. Additionally, the consumer is using a tactile overlay or set of tactile overlays, such as 930 or 1030, to assist with the transaction. As the consumer proceeds through the transaction, the audible instructions assist the user in providing appropriate input corresponding with the various screens of the touch screen display and the touch screen inputs. The audible instructions, in some embodiments, also assist the consumer in changing the tactile overlays if using a set of overlays to ensure the proper overlay is being used for the current screen. In other embodiments, the audible instructions are provided wirelessly or in various other ways as discussed above regarding the audible transaction process.

In some embodiments, the consumer carries a removable tactile overlay 1030 with them and installs or requests the clerk install the tactile overlay 1030 on the consumer interface 1020 as desired before or during a transaction at a point of sale 900. In such embodiments, the tactile overlay 1030 is configured for corresponding to the specific consumer interface 1020 in use by the merchant. Accordingly, distribution and use of standardized consumer interfaces 1020 provides the opportunity for consumers to carry and use tactile overlays 1030 as desired. In other embodiments, the tactile overlay 1030 is kept by the vendor proximate the point of sale. As such, the tactile overlay 1030 can be installed when requested by the consumer or when initiated by the modified transaction process 600 or the like. For example, in one embodiment, the consumer initiates a transaction at a point of sale 900 and indicates to the clerk that the consumer would like to use a tactile overlay 1030. The clerk and/or the consumer installs the overlay 1030 on the consumer interface 1020 and the transaction proceeds efficiently as the consumer receives tactile assistance for providing input to the terminal 910.

In various embodiments, the tactile overlay 930 or 1030 includes tactile instructions. For example, in one embodiment, the tactile overlay 930 or 1030 includes Braille proximate the one or more overlay inputs 940 or 1040 instructing a consumer the function of the one or more overlay inputs 940 or 1040. For example, in one embodiment, Braille corresponding to an overlay input indicates to the consumer that the overlay input corresponds to choosing "YES," and Braille corresponding to another overlay input indicates to the consumer that the overlay input corresponds to choosing "NO." In various other embodiments, the one or more overlay inputs 940 or 1040 themselves include Braille information. For example, in one embodiment one or more overlay inputs 940 or 1040 is a variable Braille tool that provides variable tactile communications to the consumer. In other embodiments, the variable Braille tool is disposed on the tactile overlay 930 or 1030 proximate the one or more overlay inputs such that the variable Braille tool provides instructions regarding the one or more inputs corresponding to the variable Braille tool. In one embodiment, the variable Braille message provided can be changed as required by the terminal. In some embodiments, the variable Braille tool is controlled by the processing device 255 of the point of sale 900 such that the touch screen inputs themselves are communicated through the variable Braille tool of the tactile overlay 930 or 1030. As such, the consumer, upon receiving the variable Braille communication, can choose the proper overlay input(s) for providing the consumer's desired input to the consumer interface 920 or 1020.

In summary, systems and methods provide tactile assistance to a consumer completing a transaction at a point of sale terminal. A tactile overlay, either permanent or removable, couples with a consumer interface such as a touch screen of the point of sale terminal. The tactile overlay includes one or more overlay inputs that provide a distinct tactile impression in comparison with the remainder of the overlay. For example, the overlay inputs can be depressions, apertures, protrusions, dimples, or the like, or provide a different texture such as a rougher or smoother texture than the surrounding overlay. The overlay inputs are configured to correspond with underlying touch screen inputs such that the consumer using the tactile overlay can discern the proper location on the touch screen for providing the desired input.

As will be appreciated by one of skill in the art, the present invention may be embodied as a method, apparatus (including a system), computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system."

Furthermore, embodiments of the present invention may take the form of a computer program product comprising a computer-readable storage medium having computer-usable program code/computer-readable instructions embodied in the medium. Any suitable computer-readable medium may be utilized. The computer-readable medium may be, for example but not limited to, a non-transitory medium such as an electronic, magnetic, optical, electromagnetic, infrared, or semiconductor system, apparatus, or device. More specific examples (a non-exhaustive list) of the computer-readable medium would include the following: an electrical connection having one or more wires; a tangible, non-transitory medium such as a portable computer diskette, a hard disk, a random access memory (RAM), a read-only memory (ROM), an erasable programmable read-only memory (EPROM or Flash memory), a compact disc read-only memory (CD-ROM), or other tangible, non-transitory optical or magnetic storage device; or transmission media such as those supporting the Internet or an intranet.

Computer-readable instructions for carrying out operations of the present invention may be written in an object-oriented, scripted or unscripted programming language such as Java, Perl, Smalltalk, C++, or the like. However, the computer-readable instructions for carrying out operations of the invention may also be written in conventional procedural programming languages, such as the "C" programming language or similar programming languages.

Embodiments of the present invention are described above with reference to flowchart illustrations and/or block diagrams of methods, apparatuses (systems) and computer program products according to embodiments of the invention. It will be understood that each block of the flowchart illustrations and/or block diagrams shown in the Figures, and combinations of blocks in the flowchart illustrations and/or block diagrams, can be implemented by computer-readable instructions. These computer-readable instructions may be provided to a processor of a general purpose computer, a special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer-readable program instructions may also be stored in a computer-readable memory that can direct a computer or other programmable data processing apparatus to function in a particular manner, such that the instructions stored in the computer-readable memory produce an article of manufacture including instruction mechanisms which implement the function/act specified in the flowchart and/or block diagram block or blocks.

The computer-readable program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A tactile overlay system configured for assisting a consumer engaging in a transaction at a vendor's point of sale terminal, the terminal including a consumer interface having a touch screen display, the tactile overlay system comprising:
   a first tactile overlay configured for coupling with a front side of the touch screen display comprising a touch screen, the first tactile overlay comprising:
      a first front portion of the first tactile overlay having a first front portion tactile characteristic and covering at least a covered portion of the front side of the touch screen display; and
      one or more first overlay inputs disposed on the first front portion of the first tactile overlay, the one or more first overlay inputs configured for corresponding with one or more touch screen inputs displayed on the touch screen display and also configured for providing the consumer a first overlay input tactile characteristic distinct from the first front portion tactile characteristic; and
   a second tactile overlay configured for coupling with the first tactile overlay such that a portion of the second tactile overlay at least partially covers the first tactile overlay and simultaneously at least partially covers the front side of the touch screen display, the second tactile overlay comprising:
      a second front portion of the second tactile overlay having a second front portion tactile characteristic and covering at least the covered portion of the front side of the touch screen display; and
      one or more second overlay inputs disposed on the second front portion of the second tactile overlay, the one or more second overlay inputs configured for corresponding with one or more touch screen inputs displayed on the touch screen display and also configured for providing the consumer a second overlay input tactile characteristic distinct from the second front portion tactile characteristic;
   wherein the first overlay input tactile characteristic and the second overlay input tactile characteristic are simultaneously discernible by the consumer by touch, the first overlay input tactile characteristic corresponding to at least a section of the covered portion of the front side of the touch screen display and being discernible through the second overlay.

2. The tactile overlay system of claim 1 wherein the tactile overlay is configured for permanent attachment to the consumer interface of the point of sale terminal.

3. The tactile overlay system of claim 1 wherein the tactile overlay is configured for removable attachment to the consumer interface of the point of sale terminal.

4. The tactile overlay system of claim 1 wherein the tactile overlay is at least partially transparent, thereby providing visual perception of the underlying touch screen display.

5. The tactile overlay system of claim 1 wherein the front portion tactile characteristic comprises a front portion texture and the overlay input tactile characteristic comprises an input texture, the front portion texture and the input texture being distinguishable from each other by tactile feel.

6. The tactile overlay system of claim 5 wherein the front portion texture is relatively more smooth than the input texture.

7. The tactile overlay system of claim 5 wherein the front portion texture is relatively more rough than the input texture.

8. The tactile overlay system of claim 1 wherein at least one of the one or more overlay inputs comprise a depression in the front portion such that the front portion tactile characteristic comprises a relatively higher surface than the depression of the one or more overlay inputs and the overlay input tactile characteristic comprises a relatively lower surface than the front portion.

9. The tactile overlay system of claim 1 wherein at least one of the one or more overlay inputs comprise a raised portion such that the front portion tactile characteristic comprises a relatively lower surface than the raised portion of the one or more overlay inputs and the overlay input tactile characteristic comprises a relatively higher surface than the front portion.

10. The tactile overlay system of claim 1 wherein the at least one of the one or more overlay inputs comprise an aperture defined by the front portion, and wherein the front portion tactile characteristic comprises a relatively higher tactile overlay surface than the one or more overlay inputs and the overlay input tactile characteristic comprises a relatively lower touch screen surface.

11. The tactile overlay system of claim 1 wherein the front portion comprises one or more tactile instructions each corresponding to one or more overlay inputs and configured for providing the consumer information regarding the function of the one or more touch screen inputs corresponding to the one or more overlay inputs.

12. The tactile overlay system of claim 11 wherein at least one of the one or more overlay inputs comprises one or more tactile instructions.

13. The tactile overlay system of claim 11 wherein at least one or more of the tactile instructions comprises Braille instructions.

14. The tactile overlay system of claim 1 further comprising a variable Braille tool configured for providing variable Braille tactile instructions to the consumer, the variable Braille tool configured for receiving control commands from a processing device of the terminal, the variable Braille tactile instructions providing information related to at least one of the one or more touch screen inputs corresponding to at least one of the one or more overlay inputs.

15. The tactile overlay system of claim 2 wherein the permanently attached tactile overlay is configured for moving between at least two positions comprising a tactile assistance position and a non-assistance position;

wherein the tactile assistance position, the tactile overlay is positioned such that the one or more overlay inputs are positioned proximate the corresponding one or more touch screen inputs for assisting the consumer during the transaction;

and wherein the non-assistance position, the tactile overlay is positioned such that the one or more overlay inputs are not positioned proximate the corresponding one or more touch screen inputs and therefore do not assist the consumer during the transaction.

16. The tactile overlay system of claim 1, wherein the first overlay input tactile characteristic comprises a protrusion indicator for providing tactile feedback to the customer through the second tactile overlay.

17. The tactile overlay system of claim 16, wherein the second overlay input tactile characteristic comprises a textural indicator such that the textural indicator and the protrusion indicator together provide tactile feedback to the customer indicating a different input than a configuration having a textural indicator without a protrusive indicator.

18. The tactile overlay system of claim 1, wherein the first tactile overlay and the second tactile overlay are coupled such that together they define a space between the first tactile overlay and the second tactile overlay such that the customer may depress the second tactile overlay a first amount in order to receive tactile feedback from the first tactile overlay without actuating a touch screen input and such that the customer may depress the second tactile overlay a second amount greater than the first amount in order to actuate the touch screen input.

19. A point of sale system for providing tactile assistance to a consumer completing a transaction at a point of sale of a vendor using a consumer device configured for assisting the consumer during the transaction, the system comprising:

a point of sale terminal comprising:
a consumer interface comprising:
a touch screen display configured for providing a visual representation corresponding to one or more touch screen inputs and for receiving consumer input when the consumer touches a portion of the display corresponding to the one or more touch screen inputs; and
a first tactile overlay configured for assisting a consumer engaging in a transaction at the point of sale terminal, the tactile overlay comprising:
a first front portion configured for coupling with a front side of the touch screen display, the front portion of the first tactile overlay having a first front portion tactile characteristic and covering at least a covered portion of the front side of the touch screen display; and
one or more first overlay inputs disposed on the first front portion of the first tactile overlay, the one or more first overlay inputs configured for corresponding with one or more touch screen inputs displayed on the touch screen display and also configured for providing the consumer a first overlay input tactile characteristic distinct from the first front portion tactile characteristic; and
a second tactile overlay configured for coupling with the first tactile overlay such that a portion of the second tactile overlay at least partially covers the first tactile overlay and simultaneously at least partially covers the front side of the touch screen display, the second tactile overlay comprising:
a second front portion of the second tactile overlay having a second front portion tactile characteristic and covering at least a covered portion of the front side of the touch screen display; and
one or more second overlay inputs disposed on the second front portion of the second tactile overlay, the one or more second overlay inputs configured for corresponding with one or more touch screen inputs displayed on the touch screen display and also configured for providing the consumer a second overlay input tactile characteristic distinct from the second front portion tactile characteristic;

wherein the first overlay input tactile characteristic and the second overlay input tactile characteristic are simultaneously discernible by the consumer by touch, the first overlay input tactile characteristic corresponding to at least a section of the covered portion of the front side of the touch screen display and being discernible through the second overlay;

wherein the point of sale terminal is configured for connecting with the consumer device and communicating transaction information to the consumer device, the transaction information including information instructing the consumer regarding use of the consumer interface during the transaction including information corresponding to audio messages instructing the consumer regarding an appropriate location or quadrant of the first front portion of the first tactile overlay or the second front portion of the second tactile overlay to assist the consumer in finding one or more first overlay inputs or second overlay inputs corresponding to one or more desired touch screen inputs;

wherein the consumer device is configured for processing the transaction information to create an audible transaction information signal based at least in part on some or all of the transaction information; and wherein the consumer device is further configured for initiating communication of the audible transaction information signal to the consumer.

20. The system of claim 19 further comprising a tactile overlay instruction kiosk connected with the point of sale and configured for providing tutorial information to the consumer regarding use of the tactile overlay before or during the point of sale transaction.

21. The system of claim 19 further comprising a listening device configured for communicating with the consumer device and receiving the audible transaction information signal and for producing sound waves audible to the consumer using the audible transaction information signal, thereby instructing the consumer using the tactile overlay during the transaction.

22. The system of claim 19 wherein the consumer device comprises a listening device for receiving the audible transaction information signal and producing the sound waves audible to the consumer based at least in part on the audible transaction information signal, thereby instructing the consumer using the tactile overlay during the transaction.

23. The system of claim 19 wherein the tactile overlay is further configured for permanent attachment to the consumer interface of the point of sale terminal.

24. The system of claim 19 wherein the tactile overlay is further configured for removable attachment to the consumer interface of the point of sale terminal.

25. The system of claim 19 wherein the tactile overlay is at least partially transparent, thereby providing visual perception of the underlying touch screen display.

26. The system of claim 19 wherein the front portion tactile characteristic comprises a front portion texture and the overlay input tactile characteristic comprises an input texture, the front portion texture and the input texture being distinguishable from each other by tactile feel.

27. The system of claim 26 wherein the front portion texture is relatively more smooth than the input texture.

28. The system of claim 26 wherein the front portion texture is relatively more rough than the input texture.

29. The system of claim 19 wherein at least one of the one or more overlay inputs comprise a depression in the front portion such that the front portion tactile characteristic comprises a relatively higher surface than the depression of the one or more overlay inputs and the overlay input tactile characteristic comprises a relatively lower surface than the front portion.

30. The system of claim 19 wherein at least one of the one or more overlay inputs comprise a raised portion such that the front portion tactile characteristic comprises a relatively lower surface than the raised portion of the one or more overlay inputs and the overlay input tactile characteristic comprises a relatively higher surface than the front portion.

31. The system of claim 19 wherein the at least one of the one or more overlay inputs comprise an aperture defined by the front portion, and wherein the front portion tactile characteristic comprises a relatively higher tactile overlay surface than the one or more overlay inputs and the overlay input tactile characteristic comprises a relatively lower touch screen surface.

32. The system of claim 19 wherein the front portion of the tactile overlay comprises one or more tactile instructions each corresponding to one or more overlay inputs and configured for providing the consumer information regarding the function of the one or more touch screen inputs corresponding to the one or more overlay inputs.

33. The system of claim 32 wherein at least one of the one or more overlay inputs of the tactile overlay comprises one or more tactile instructions.

34. The system of claim 32 wherein at least one or more of the tactile instructions comprises Braille instructions.

35. The system of claim 19 wherein the tactile overlay further comprises a variable Braille tool configured for providing variable Braille tactile instructions to the consumer, the variable Braille tool configured for receiving control commands from a processing device of the terminal, the variable Braille tactile instructions providing information related to at least one of the one or more touch screen inputs corresponding to at least one of the one or more overlay inputs.

36. The system of claim 23 wherein the permanently attached tactile overlay is configured for moving between at least two positions comprising a tactile assistance position and a non-assistance position;

wherein the tactile assistance position, the tactile overlay is positioned such that the one or more overlay inputs are positioned proximate the corresponding one or more touch screen inputs for assisting the consumer during the transaction;

and wherein the non-assistance position, the tactile overlay is positioned such that the one or more overlay inputs are not positioned proximate the corresponding one or more touch screen inputs and therefore do not assist the consumer during the transaction.

37. A method for providing a consumer tactile assistance in completing a transaction at a point of sale terminal, the method comprising:

receiving consumer input regarding the consumer's preference for a tactile overlay transaction modification before or during the point of sale transaction;

in response to receiving the consumer input regarding the consumer's preference for a tactile overlay transaction modification, electromechanically coupling a first tactile overlay with a consumer interface having a touch screen display for receiving consumer input regarding the transaction;

receiving consumer input regarding the transaction with the touch screen display;

in response to receiving consumer input regarding the transaction with the touch screen display, electromechanically coupling a second tactile overlay with the first tactile overlay such that the first tactile overlay makes physical contact with the touch screen display when actuated by touch and such that the second tactile overlay does not make physical contact with the touch screen display when actuated by touch;

wherein the first tactile overlay and the second tactile overlay both cover a covered portion of the touch screen display;

wherein the first tactile overlay has a first tactile characteristic and the second tactile overlay has a second tactile characteristic; and wherein the first tactile characteristic is discernible through the second tactile overlay.

38. The method of claim 37 wherein the coupling comprises automatically installing the tactile overlay on the consumer interface based at least in part on the received consumer input.

39. The method of claim 37 wherein the method further comprises performing, in conjunction with the method, at least one of an audible transaction process, a mobile device consumer interface transaction process, and a modified transaction process.

* * * * *